(12) United States Patent
Levin et al.

(10) Patent No.: US 8,131,312 B2
(45) Date of Patent: Mar. 6, 2012

(54) METHOD AND SYSTEM FOR CONSTRUCTION OF RADIO ENVIRONMENT MODEL

(75) Inventors: Moshe Levin, Tel-Aviv (IL); Avraham Freedman, Tel Aviv (IL)

(73) Assignee: Nice Systems Ltd., Raanana (IL)

( * ) Notice: Subject to any disclaimer, the term of this patent is extended or adjusted under 35 U.S.C. 154(b) by 110 days.

(21) Appl. No.: 12/848,572

(22) Filed: Aug. 2, 2010

(65) Prior Publication Data

US 2011/0287801 A1 Nov. 24, 2011

Related U.S. Application Data

(63) Continuation-in-part of application No. 12/786,173, filed on May 24, 2010.

(51) Int. Cl.
*H04B 17/00* (2006.01)
(52) U.S. Cl. ............... 455/517; 455/456.2; 370/254; 342/174
(58) Field of Classification Search ............ 455/517, 455/456.2, 67.11; 370/254, 328, 401; 342/174, 342/125
See application file for complete search history.

(56) References Cited

U.S. PATENT DOCUMENTS

| | | | |
|---|---|---|---|
| 5,890,068 A | 3/1999 | Fattouche et al. | |
| 5,952,969 A | 9/1999 | Hagerman et al. | |
| 6,009,334 A | 12/1999 | Grubeck et al. | |
| 6,011,974 A | 1/2000 | Cedervall et al. | |
| 6,040,800 A | 3/2000 | Raith et al. | |
| 6,097,959 A | 8/2000 | Yost et al. | |
| 6,157,842 A | 12/2000 | Karlsson et al. | |
| 6,166,691 A | 12/2000 | Lindqvist | |
| 6,204,812 B1 | 3/2001 | Fattouche | |
| 6,459,903 B1 | 10/2002 | Lee | |
| 2001/0041575 A1 | 11/2001 | Amirijoo et al. | |
| 2001/0044311 A1 | 11/2001 | Larsson et al. | |
| 2002/0016172 A1 | 2/2002 | Kangras et al. | |
| 2002/0167444 A1 | 11/2002 | Lee | |
| 2002/0168989 A1 | 11/2002 | Dooley et al. | |
| 2004/0072579 A1 | 4/2004 | Hottinen | |
| 2004/0110514 A1 | 6/2004 | Kim et al. | |
| 2004/0117108 A1 | 6/2004 | Nemeth | |
| 2005/0148346 A1 | 7/2005 | Maloney et al. | |
| 2005/0208951 A1 | 9/2005 | Annunziato et al. | |
| 2005/0276233 A1* | 12/2005 | Shepard et al. | 370/254 |
| 2006/0262011 A1 | 11/2006 | Bull et al. | |
| 2006/0267833 A1* | 11/2006 | Langford et al. | 342/174 |
| 2007/0121560 A1 | 5/2007 | Edge | |

(Continued)

FOREIGN PATENT DOCUMENTS

CA 2442950 3/2005

(Continued)

OTHER PUBLICATIONS

U.S. Appl. No. 13/108,555, filed May 16, 2011, Levin et al.

(Continued)

*Primary Examiner* — Phuoc Doan

(74) *Attorney, Agent, or Firm* — Pearl Cohen Zedek Latzer LLP

(57) ABSTRACT

A system and method for constructing a signal propagation model in a wireless communication system such as a cellular system based on at least one received wireless signal correlated to a geographic location.

22 Claims, 13 Drawing Sheets

U.S. PATENT DOCUMENTS

| | | |
|---|---|---|
| 2007/0161385 A1 | 7/2007 | Anderson |
| 2008/0032708 A1 | 2/2008 | Guvenc et al. |
| 2008/0137524 A1 | 6/2008 | Anderson et al. |

FOREIGN PATENT DOCUMENTS

| | | |
|---|---|---|
| GB | 2416461 | 7/2009 |
| WO | WO 03098525 | 11/2003 |

OTHER PUBLICATIONS

Levanon, "Radar Measurements", Radar Principles, 1988, pp. 1-4, Chapter 1, Wiley and Sons.

Levanon, et al., "Ambiguity Function", Radar Signals, 2004, pp. 34-37, Chapter 3, John Wiley & Sons, Inc.

Kay, "Maximum Likelihood Estimation", Fundamentals of Statistical Signal Processing: Estimation Theory, 1993, pp. 166-173, Chapter 7, Prentice-Hall, Englewood Cliffs, NJ.

Stoica et al., "Amplitude Estimation of Sinusoidal Signals: Survey, New Results, and an Application," IEEE Transactions on Signal Processing, Feb. 2000, pp. 338-352, vol. 48, No. 2.

Blaunstein, "Introduction to the Wireless Propagation Environment", Radio Propagation in Cellular Networks, 2000, Chapter 1, Artech House.

Cichon et al., "Propagation Prediction Models", Digital Mobile Radio Towards Future Generation Systems, pp. 115-207, Chapter 4, COST Telecom Secretariat, Brussels.

Rappaport, "Mobile Radio Propagation: Small-Scale Fading and Multipath", Wireless Communication, Principles and Practices, 2002, pp. 139-147, Chapter 4, Prentice Hall.

Molisch, "Statistical Description of the Wireless Channel", Wireless Communications, Second Edition, 2005, pp. 69-90, Chapter 5, John Wiley & Sons, Ltd., Chichester, UK.

Stüber, Principles of Mobile Communication, 1996, pp. 70-74, Kluwer, Boston, MA.

Arfken, "Method of Steepest Descents", Mathematical Methods for Physicists, 3rd ed., 1985, pp. 477-485, Chapter 7.4, Academic Press, Orlando, FL.

Aldenderfer et al., "Cluster Analysis", Sage Publications, Inc., 1985, pp. 7-88, Los Angeles, CA.

Stoica et al., "MUSIC, Maximum Likelihood, and Cramer-Rao Bound", IEEE Transactions on Acoustics, Speech, and Signal Processing, vol. 37, No. 5, May 1989, pp. 720-741.

Capon, "High-Resolution Frequency-Wavenumber Spectrum Analysis", Proceedings of the IEEE, vol. 57, No. 8, Aug. 1969, pp. 1408-1418.

Bose et al., "Sequence CLEAN: A Modified Deconvolution Technique for Microwave Images of Contiguous Targets", IEEE Transactions on Aerospace and Electronic Systems, vol. 38, No. 1, Jan. 2002, pp. 89-97.

U.S. Appl. No. 12/786,173, filed May 24, 2010, Levin et al.

* cited by examiner

METHOD AND SYSTEM FOR CONSTRUCTION OF RADIO ENVIRONMENT MODEL

CROSS-REFERENCE TO RELATED APPLICATIONS

This application is a continuation-in-part application of U.S. patent application Ser. No. 12/786,173, filed May 24, 2010 entitled "METHOD AND SYSTEM FOR MOBILE STATION LOCATION" which is incorporated in its entirety herein by reference.

FIELD OF THE INVENTION

The present invention relates generally to environmental modeling, and in particular to calibration of an environmental model using wireless signals.

BACKGROUND OF THE INVENTION

Accurate location of mobile terminals, e.g. mobile telephones, in a wireless system, for example, a cellular telephone communication system, has been a difficult challenge. Several techniques have been proposed and partially developed to address this problem, but there remains a need for a technique with greater precision of location. It is generally desirable that such a location system be relatively low cost, require little or no modification to existing user hardware and software, and not disrupt operation of the communication system.

Prediction of received signal strength of signals from mobile terminals that may be operating in actual environments may be a difficult task. A source of difficulty may be a lack of available information about a propagation environment, at least in a precision that may be required for an accurate application of a theory of wave propagation, e.g. electromagnetic wave theories presented by James Clerk Maxwell. This lack of information may be inherent in a modeling problem as a propagation environment may be changing dynamically, and also may be random in nature. An assumption may be made of a certain physical model and may not be directly related to an actual physical environment. It is generally desirable that such a model be based more on signal strength measurements from an actual environment.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
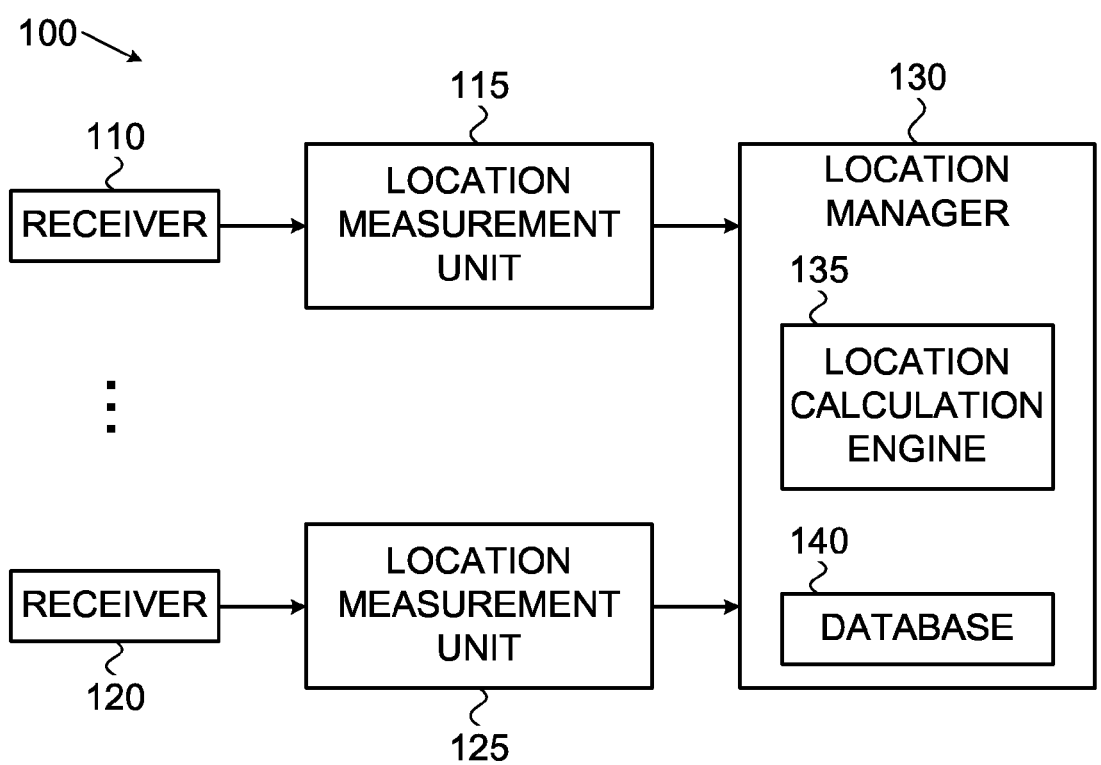
FIG. 1a depicts an exemplary block diagram illustrating a system according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a base station, a modem, a wireless modem, a Personal Computer (PC), a desktop computer, a mobile computer, a laptop computer, a notebook computer, a tablet computer, a netbook computer, a server computer, a handheld computer, a handheld device, a Personal Digital Assistant (PDA) device, a handheld PDA device, any consumer electronic device, a network, a wireless network, a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.16, 802.16d, 802.16e, 802.11a, 802.11b, 802.11g, 802.11n standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Interim Standard 95 (IS-95), Multi-Carrier Modulation (MCM), Discrete Multi-Tone (DMT), Bluetooth®, ZigBee™, or the like. Embodiments of the invention may be used in various other apparatuses, devices systems and/or networks.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

According to embodiments of the present invention, the location, e.g., probably point or vicinity area, of a mobile device, e.g., a mobile communication device such as a mobile phone, may be determined by receiving signals transmitted from a device during communication with a base station. According to embodiments of the invention, one or more devices for reception of signals from mobile communication devices may be deployed in a geographic region. As described herein, according to some embodiments of the invention, the devices may be passive, or receive-only devices, with no transmission capabilities; according to other embodiments of the invention, the devices may have some transmission capabilities, but not necessarily transmission capabilities required to transmit throughout a cell region with mobile communication devices therein; according to yet other embodiments of the invention, the devices or their functionality may be combined with a base station.

In existing mobile communication systems, mobile communication devices may transmit signals substantially omni-directionally. Signals from a mobile communication device, e.g. a wireless transmitter, may alternately be transmitted with directional information. A variety of methods may be available for directionally transmitting signals. These omni-directionally transmitted signals, or directional signals, may be received by two or more receiver devices according to embodiments of the invention. Each receiver may be connected, either wired or wirelessly to measuring devices that may determine properties of received signals transmitted by mobile devices, for example, the strength of a received signal, e.g., RSSI, signal power, signal-to-noise ratio, etc. Measuring devices may be connected to or associated with a management and calculation device that may process received signals and other information that may be generated from the received signals, from a plurality of receivers covering a region. Processing of the information may include a determination of a set of locations where a transmitter may be spatially positioned based on timing information from one or more than one receiver device. Additionally or alternatively, processing may include using techniques to reduce a set of possible locations to a smaller set of one or more likely locations of the wireless transmitter.

Signals may be received at an antenna that may be directional, and, for example, properties of an antenna may be used to determine a received signal direction by comparing a relative received signal strength to properties of an antenna, e.g., a main lobe boresight versus sidelobes of an antenna. Received signals that may include directional information may be received by receivers connected to measurement devices for additional measurements, e.g. power measurements, and may be used substantially as described herein. Calculations and a determination of a location may include directional information obtained from signal and/or antenna properties, or other received properties that may include directional information.

Reference is made to FIG. 1a, which is a schematic depiction of a system 100 according to an embodiment of the present invention. The system may include a plurality of receivers 110, 120, and optionally other receivers (not shown), respective location measurement units 115, 125, and optionally other location measurement units (not shown), a location manager 130, which may include a location calculation engine 140, and a database 140. It will be understood that the figure is a schematic diagram, and that components or modules depicted as separate may be combined, and single depicted components may be divided into more than one component, etc. within the scope of the present invention.

The receivers 110, 120 may receive signals transmitted by a wireless device in their mutual proximity. Receivers 110, 120, may be independent devices, or they may be connected to an element of a communications infrastructure, e.g. a base station. It will be recognized that a system may include some independent and some dependent receiver devices. A receiver may include an antenna, a coupling device, amplifiers, and other radio frequency (RF) devices and modules used for signal reception and processing. A receiver may be physically or virtually connected to or associated with an element of a communications infrastructure, e.g., a base station, where a virtual connection may make use of existing communications infrastructure antennas and other devices to receive signals.

A receiver may receive a signal and send it to a location Measurement Unit (LMU) 115 and 125. A receiver 110 may be connected to and/or associated with a respective location measurement unit (LMU) 115. It will be recognized that LMU 115 may be located proximate to and/or form a part of receiver 110, or LMU 115 may be located at a location remote from receiver 110. Receiver 120 may be connected to respective LMU 125 in a similar fashion. LMUs 115, 125 may perform RF signal processing and/or other tasks that may be use to determine properties of received signals, e.g., a received signal power or other parameter that may be used to assist in location determination.

LMUs 115, 125 may be connected in any suitable fashion to location manager 130. Location manager 130 may be located at remote location or may be located at or proximate to one or more LMUs. Location manager 130 may be connected to LMUs by a wired or wireless connection. Location manager 130 may use signal-related information provided by a plurality of LMUs, e.g., 115, 125, to determine one or a set of possible or probable locations of a wireless transmitter whose signals have been received by receivers 110, 120. Location manager 130 may be able to distinguish a wireless transmitter from one or more other wireless transmitters that may be transmitting within range of an antenna and receiver 110. Location Manager 130 may include a network, network component, a server and a processor.

Location manager may include a location calculation engine 135, wherein location calculation engine 135 may form a part of a location manager 130 or be operably connected to a location manager 130. Location calculation engine 135 may include sub-units (not shown) for performing its functions, e.g., a processor, a memory, a communication module, and other elements used for receiving data from LMUs, performing calculations, and communicating calculation results. Location calculation engine 135 may calculate a position or set of positions of a wireless transmitter by one or more methods, e.g. time of arrival, time of difference of arrival, ray tracing, or other methods, based on the signal received at a receiver device, measured at LMU and communicated to location manager.

Location manager may include or be operatively associated with database 140. Database 140 may be accessed by location calculation engine 135, which may use data obtained therefrom as inputs to location calculations. Database 140 may contain terrestrial feature information pertaining to the geographic region of interest associated with the operative receiving areas of receivers. The terrestrial features may include data pertaining to objects and other features that may affect signals transmitted by mobile devices and received by receivers, e.g., man-made buildings, structures or other features, and/or natural features, e.g., mountains, etc. Data pertaining to terrestrial features may include location and height of obstacles, and may additionally include detailed information that may further describe features, e.g., a material or materials associated with the feature, which may affect signal reception by receiver. Other data pertaining to terrestrial features may be size and dimensions of the feature, and additional feature elements, such as protrusions and the like. Terrestrial feature information may be static, or may be time dependent, for example during a certain period of a year snow may cover a portion of a natural feature, e.g., a mountain. Each feature may have associated with it one or more RF properties and/or effects it may induce onto RF signals during propagation through or near each feature. Location calculation engine 135 may use such feature-related RF propagation information to reduce an error of a calculation of a location of a wireless transmitter.

According to an embodiment of the invention, receiver devices may include the substantial receiving functionality of a base station, for example, a cellular system base station operating in a receive-only mode, referred to herein as a passive receiver. Passive receivers may be based on a simplified chipset, e.g., a femtocell chipset. In some embodiments of the invention, for purposes of simplicity, the passive receiver need not include all hardware of a base station, for example, the passive receiver may be connected to an existing antenna and/or a power amplifier, such those forming part of a cell base station. A passive receiver may receive signals that may be transmitted by mobile stations while having little or no effect on the normal performance of a base station. Signals received at the passive receiver from a mobile device may be may be decoded, and the receiver may measure a signal strength of the received signal and/or a time of arrival of a received signal. As described herein, a receiver positioned in a communication system employing greater bandwidth may allow for more precise location measurement. Thus, for example, a third generation Universal Mobile telecommunications System (UMTS) system, may use a signal having a wide bandwidth, thereby allowing for increased resolution of range measurements by the system according to embodiments of the present invention.

In an embodiment of the invention, a code division multiple access (CDMA) signal may be used, e.g., UMTS, and may be received by a receiver, which may include, for example, a Rake receiver. A receiver, e.g. a Rake receiver, may, for example receive a signal that may have rays that may be associated with spectral lines that may be received. A delay of each finger output of a Rake receiver may include a delay of each ray that may arrive at a receiver and/or a power of each ray. A system may be, for example a fourth generation system, e.g., long term evolution (LTE) or Worldwide Interoperability for Microwave Access (WiMAX), which may be expected to use a wide bandwidth and a full measurement of a spectral channel response may be available, and delays and/or power of impinging rays may be estimated. A system, e.g. a third or fourth generation system, may be equipped with an antenna system that may include an array of antennas, and may be used to provide a spatial signature, for example a direction of one or more impinging rays.

An embodiment of the invention may use a database, e.g. a geographical database that may include terrain information, building information, road information, land use information, and/or other geographical feature information. Such a database may be used for prediction of a ray trajectory and/or prediction of a ray power of one or more rays, and may be used to determine an estimation of a propagation delay that may be associated with each point source, as well as a propagation delay spread. A ray trajectory may be determined by a variety of methods, for example, ray tracing. A signal strength at any point may also be estimated, and may correspond to a measure of an error in an estimation that may be based on a prediction.

An embodiment of the invention may use data pertaining to time of arrival (TOA), time of difference of arrival (TDOA), or another property of a signal from the mobile device to one or a plurality of receivers to form an estimate of a location of a mobile device. Received signal strength information may be utilized to refine a location estimate, and may be integrated into a location estimation process. For example, in the event the signal is received by a plurality of receivers, the time of arrival data may be looked up in the database, and a loci of possible locations may be determined for each receiver. A set of intersection points of the loci may further narrow the possible locations. Thus, for example, a TOA method of localization may be based upon intersections of loci, where such loci may be equidistant, and may be from several devices. Such loci may be formed from a set of propagation delays that may be measured by receivers, and may be from each device. An intersection may be determined of a locus of all points at a first measured distance from a first device, a locus of all points at a second measured distance from a second device and, optionally, a locus of all points at a third measured distance from a third device, etc. It will be recognized that the degree of precision or disambiguation may increase with the number of receivers. Measurements may or may not be precise, and additional measurements may be used to contribute to increasing an accuracy of a result.

Figure 1B:
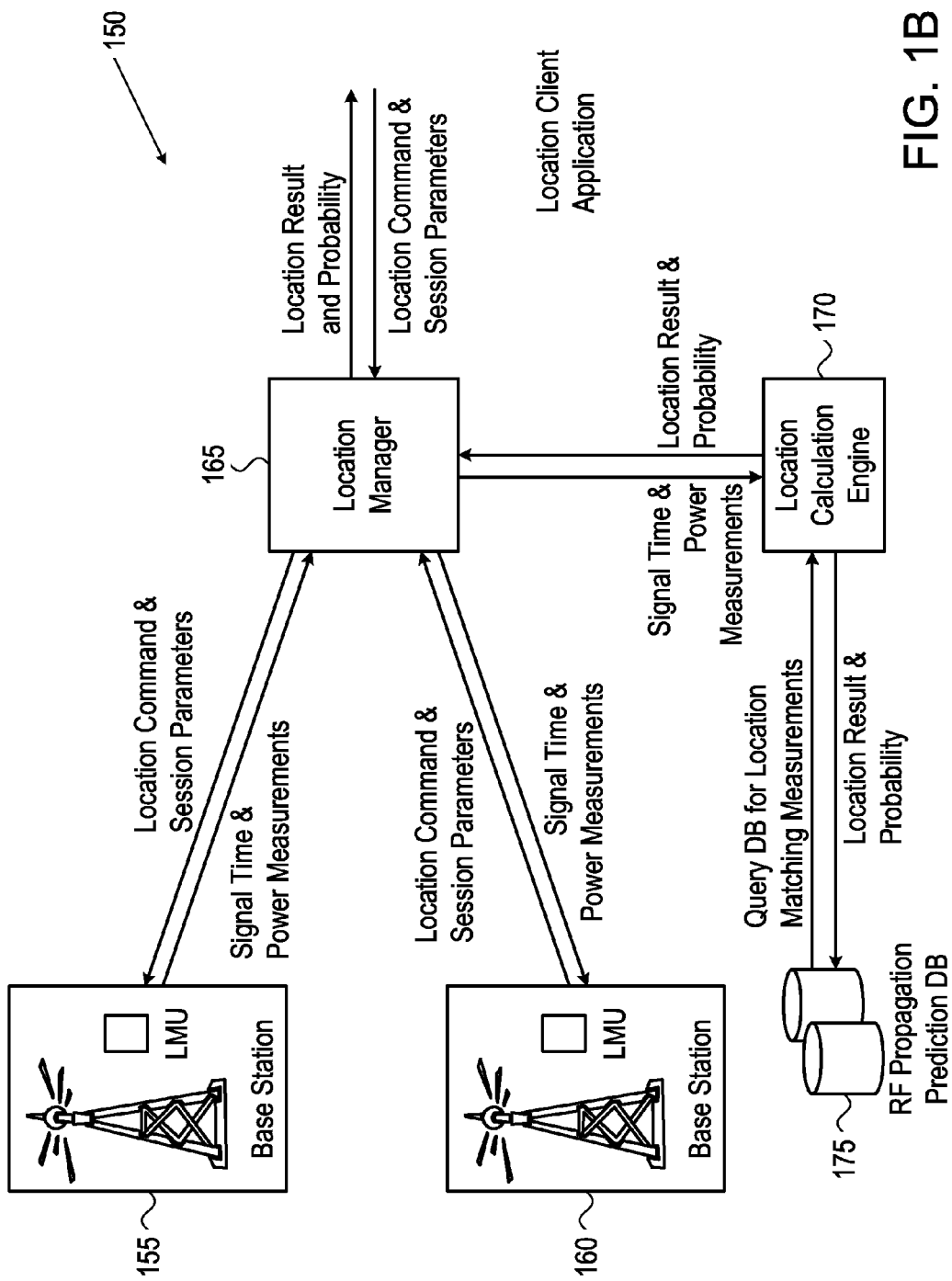
FIG. 1b depicts an exemplary block diagram illustrating a system according to embodiments of the present invention.
Figure 9:
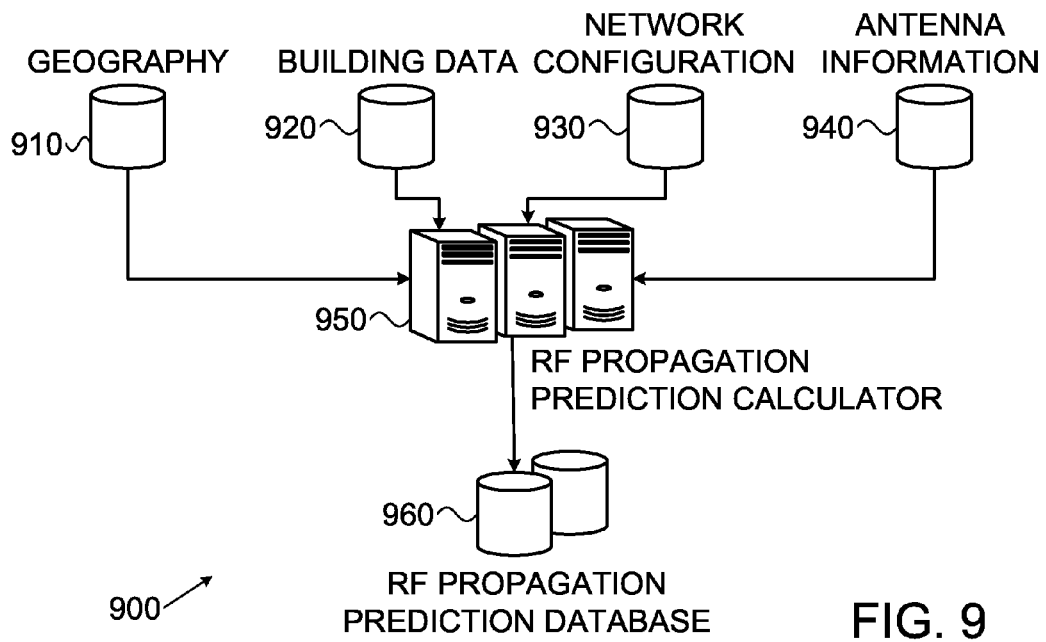
FIG. 9 depicts an exemplary block diagram illustrating an embodiment of a system according to embodiments of the present invention.

Reference is made to FIG. 1b, which is a schematic depiction of an alternate arrangement of a system 150 according to embodiments of the invention. A system may be controlled by a Location Manager 165 that may receive location command and session parameters from a Location Client Application. Session parameters, which may include a mobile station identification, may be transferred to location measurement units (LMU), which may be installed at base station sites 155, 160, and may be connected to base station antennas. Measurement units may perform time of arrival measurements, for example single or multiple readings, and signal strength measurements. An LMU 165 may also decode mobile station messages and may extract measurements that may be performed by a mobile unit, e.g. time advance measurements, signal strength measurements during handover, etc. Time and power measurements may then be transferred from one or more LMUs to a Location Manager 165, which may transfer them to a Location Calculation Engine 170. A Location Calculation Engine 170 may perform location calculations, and may estimate a location accuracy, or alternatively a probability of a location within a predefined error. Such results may be returned to a Location Manager 165, which may return these results back to a Location Client Application. An exemplary embodiment of the invention may be to use an RF prediction database 175, as may be described below, and shown by exemplary schematic FIG. 9. A database may be created during a pre-processing stage, and may reduce a load of calculations that may be required in real time. An RF prediction may use a geographical database which may include terrain height and/or land use information, building data which may include building contours and/or height, network configurations which may include locations of a plurality of the base stations 155, 160 and/or LMUs, and may include locations of all of the base stations 155, 160 and/or LMUs, and antenna information which may include height, type and/or orientation of each antenna. An RF prediction calculator may create a large database that may cover an entire coverage area of a system, e.g. a cellular system. Such a database may be a three dimensional database, which may include in-building bins in various floors. For each bin, a database may include a list of rays from each LMU and each base station 155, 160, as described below. Sensors may be all single-reading, and a database may be compressed to contain a single range plus delay spread information. A multi-reading sensor, or sensors, may be used and compression may be made according to a signal resolution number of measurements that may be provided by sensors. Upon reception of a query, a location engine may search a database for a best fit of one or more range vectors and/or one or more signal strength vectors for a received set of measurements.

Figure 2:
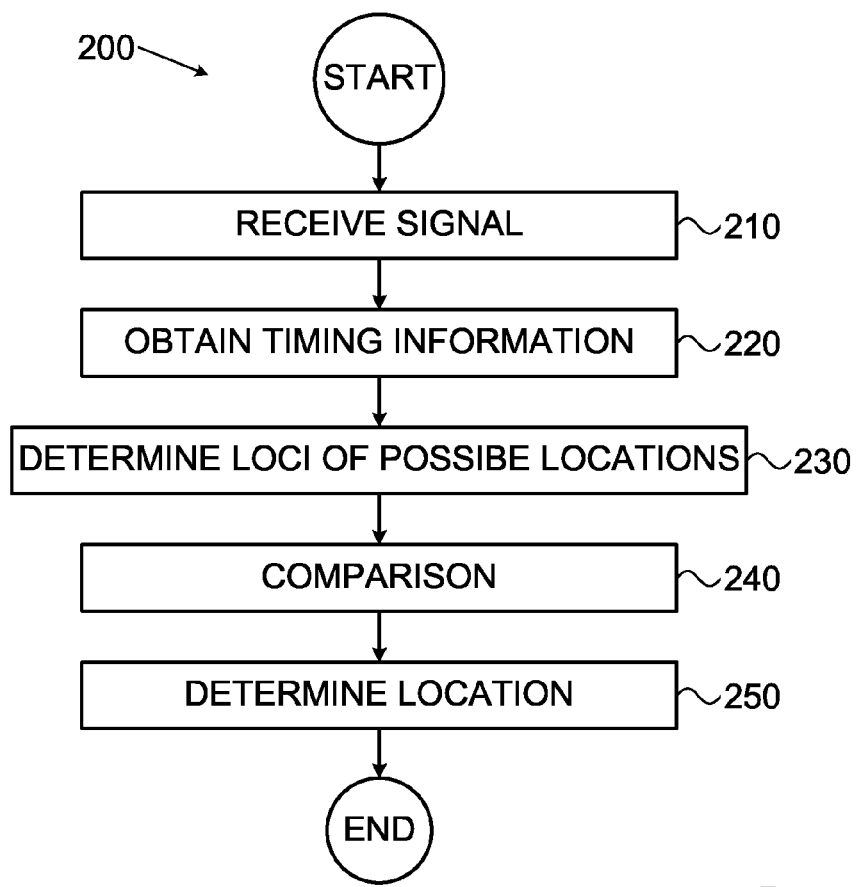
FIG. 2 depicts a method according to embodiments of the present invention.

An embodiment of a method for determining a location of a wireless transmitter 200 may be described by reference to FIG. 2. Signals may be received 210 by receivers and measurement devices. Signals may be received by antennas that may be connected to receivers, and antennas may be directional or omni-directional. Signals that may be received may be used to obtain timing information 220. Timing information may be obtained by several methods, e.g. autocorrelation peak detection, early-late gate or edge detection. Timing information may be used in conjunction with received signal strength information, or other metrics, or used alone. Timing information may be collected at fixed or variable intervals, and may depend on system factors, e.g. whether a transmitter may be moving or stationary. Other methods, e.g. use of a high-accuracy clock or system clock, may be used to provide accurate timing information. Loci of possible locations of transmitters may be determined 230 by processing timing information (e.g., by TOA or TDOA), or by correlating with other signal indicators, e.g. signal strength. A comparison may be made 240 to stored parameters and may be used to reduce a number of possible locations of a transmitter. Stored parameters may be terrestrial features or artificial structure features, e.g. building features. Stored parameters may also have been determined from measurements of signals from wireless transmitters that may have been at known locations during transmission. Such stored parameters may be stored in a database, and may be accessible by a processor searching a database. A comparison 240 may be an optional process in some embodiments, and using loci of possible locations that may have been determined 230 may be sufficient to determine a location or possible set of locations of a transmitter for an application. A location of a wireless transmitter may be determined 250 by a location manager, as described herein. A location determination 250 may be made from possible loci, comparison to a database, triangulation, or other like methods, or a combination thereof.

Figure 3:
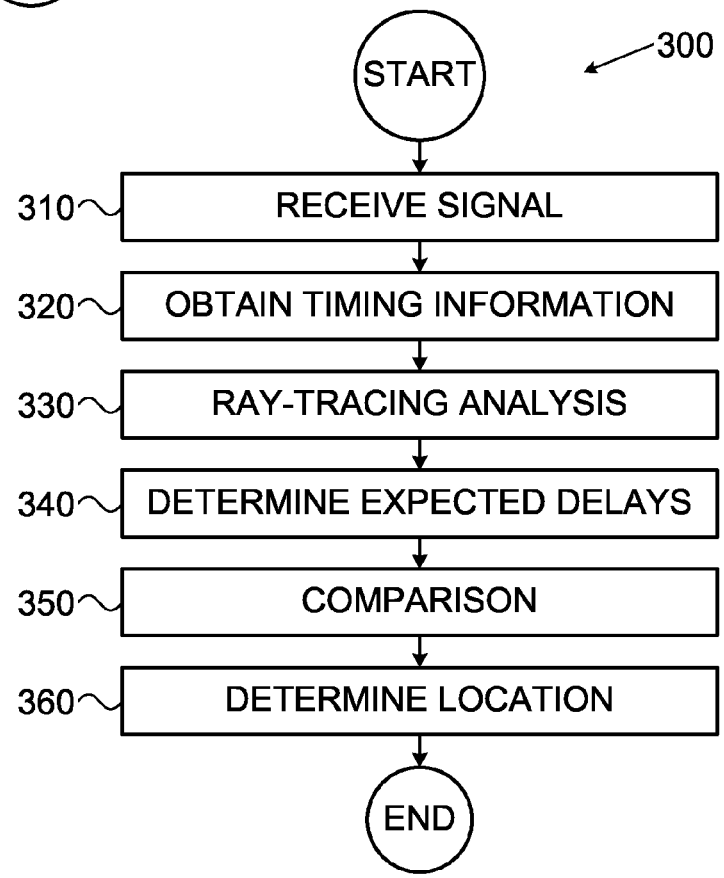
FIG. 3 depicts a method according to embodiments of the present invention.

Another embodiment of a method for determining a location of a wireless transmitter 300 may be described by reference to FIG. 3. Signals may be received 310 by receivers and measurement devices. Signals may be received by antennas that may be connected to receivers, and antennas may be directional or omni-directional. Signals that may be received may be used to obtain timing information 320. In some embodiments signals may have directional information that may be extracted, for example CDMA signals that may be received by correlation receivers may use an output of a receiver, e.g. a Rake receiver, to determine path propagation information. Correlator outputs from fingers of a rake receiver may be used to determine power received from a ray, and an amplitude and/or time determination may be made. Timing information may be obtained by several methods, and may include RF receiver techniques, e.g. directional antennas, processing techniques, e.g. early-late gate or edge detection, other like techniques, or a combination thereof. Timing information may be collected at fixed or variable intervals, and may depend on system factors, e.g. whether a transmitter may be moving or stationary. Other methods, e.g. use of a high-accuracy clock or system clock, may be used to provide accurate timing information. A ray tracing analysis 330 may be used for analysis of signals that may have been received and outputs of correlation, or other like receivers. A ray tracing analysis 330 may include consideration of rays reflecting, diffracting, scattering, refracting, or other RF effects. A ray tracing analysis 330 may include determining a power, a distance travelled and/or an angle of arrival at a receiver. Expected delays of received signals may be determined 340 by using outputs of a ray tracing analysis. A determination of expected delays 340 may include TOA or TDOA information. Loci of possible transmitter locations may be determined from expected delays that may have been determined. A comparison may be made 350 to stored parameters and may be used to reduce a number of possible locations of a transmitter. Stored parameters may be terrestrial features or artificial structure features, e.g. building features. Stored parameters may also have been determined from measurements of signals from wireless transmitters that may have been at known locations during transmission. Such stored parameters may be stored in a database, and may be accessible by a processor searching a database. A comparison 350 may be an optional process in some embodiments, and using outputs of a ray tracing analysis 330 and a determination of expected delays 340 may be sufficient to determine a location or possible set of locations of a transmitter for an application. A location of a wireless transmitter may be determined 360 by a location manager, as described herein. A location determination 360 may be made from possible loci, outputs of ray tracing, comparison to a database, triangulation, or other like methods, or a combination thereof. Accuracy of a determination 360 may, in some embodiments, depend on resolution of rays that may be received by a receiver, e.g. a number of received rays from a transmitter. Algorithms may be used where elements, e.g. power, path length, predetermined or in situ determined irrelevant directions, may be applied to select a set of rays from all rays received, and accuracy of a location determination 360 may be improved.

In some embodiments a wireless transmitter may be in use on a GSM system. A transmitter may be in communication with a single base station. Another base station may be within RF signal range of a transmitter and may be choosing to ignore a transmitter that a base station is not providing communication services. A mobile station, or transmitter, may measure a radio, or received, signal strength (RSS) from neighboring base stations and may report a measurement to a base station that may be providing communication services and connectivity. A mobile station may be handed-off from a serving base station to another base station, for example to maintain continuous communication service during motion of a mobile transmitter. A hand-off process may include a base station measuring a time advance (TA), and a TA may be used as a range measurement. A TA that may be used as a range measurement may be a technique for determining loci of possible locations. RSS measurements that may be from a mobile station and TA measurements that may be from a base station, e.g. a serving base station, may be inputs to a location process, as described herein.

In other embodiments a wireless transmitter may be in use on a CDMA or a UMTS system. A transmitter may be in communication with a plurality of base stations, and may have a plurality of base stations that may be providing connectivity and communication services, e.g. serving base stations. A mobile transmitter may be handed from a base station to another by a dynamic hand-off process, e.g. a soft handover. In such an embodiment a plurality of base stations may report propagation delay information to a location manager in a simultaneous, or nearly simultaneous, fashion, each doing so as described herein. Additional information that may be obtained from a plurality of base stations reporting information relevant to a transmitter may be used to reduce errors or ambiguities of location determinations. In some embodiments, some reporting may occur more frequently than other embodiments, e.g. a CDMA system may report more frequently than a UMTS system.

Other embodiments may have LMUs that may be dedicated devices configured for receive-only operation. Such LMUs may have a capability of a base station, and may be configured to receive signals from both transmitters that a host base station may in communication with and also other transmitters that may be within range but not in active communication. Signals that may be received from each transmitter within range may be used to determine timing information and/or range information, as described herein. RSS measurements may also be determined from each transmitter within range. An LMU may be part of a communication system, or may be connected to a communication system with, for example, a shared antenna. An LMU that may share an antenna may be connected in a fashion so as to not disturb a communication system, but rather tap a signal from an antenna. A device may be used to facilitate such signal sampling, e.g. a signal or power coupler. An LMU may also be connected to a dedicated antenna.

Figure 4:
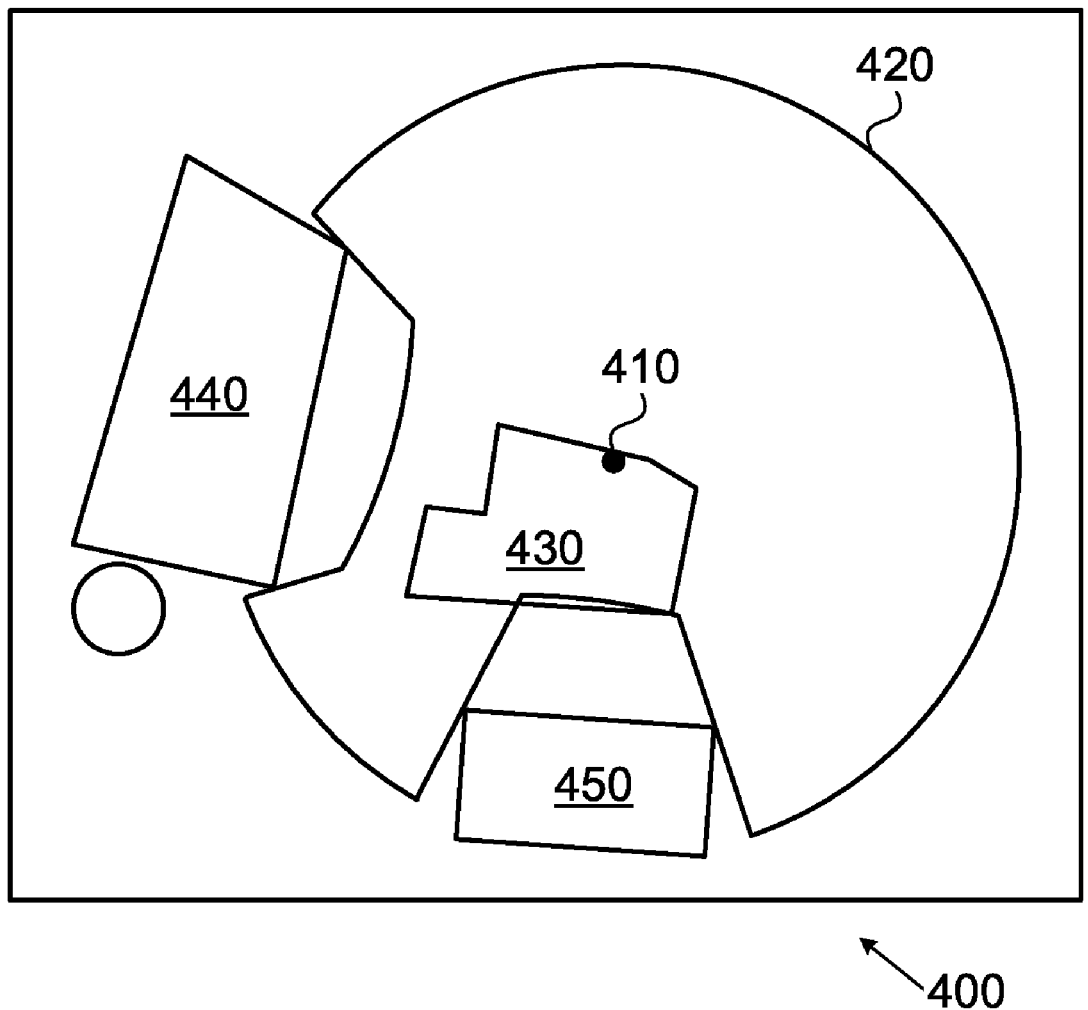
FIG. 4 depicts an exemplary diagram according to embodiments of the present invention.

Loci of equidistant points in free space may be depicted as circles. Loci of points in an environment, for example a build up environment 400, may be comprised of one or more circles that may be distorted, and may be described by reference to FIG. 4. A base station 410 may have an equidistant locus 420 around it, and such a locus may be shown as a two-dimensional locus for pictorial convenience. A base station 410 may be installed on a top of a building 430. Other buildings 440 and 450 may be in a vicinity of base station 410, and may cause a distortion of an equidistant locus 420, and may result in a deviation from a free space circular shape. Distortions may be caused by a variety of effects on signal propagation. For example, a distortion may be caused by an inability of a signal to penetrate a structure in a case where there may be a greater amount of signal reflection from a structure than signal penetration.

An embodiment of the invention may use TDOA techniques. TDOA may be used where a transmission of a signal may be received, and may be recorded, at two or more devices, and an absolute time an event, for example a signal transmission, may occur may not be available to such receiver devices. A difference in a propagation delay may be available, may be significant, and may be more significant than an absolute time of a signal reception. A free space environment may have signals that may form a loci of points for which a difference in propagation delays between two or more receiver devices may be a constant, may be referred to as equi-difference loci, and may be hyperbolas. In an environment where obstacles, e.g. buildings may be present, a shape of such a hyperbola may be distorted, where such distortion may be a result of a presence of such obstacles.

Receiver devices may have a capability of measurement of arrival times of rays, or sets of rays of signals. An exemplary case of a UMTS system that may have a Rake receiver, or an exemplary case of a $4^{th}$ generation system, may be able to receive rays, where such rays may be separately received, and equidistant or equi-difference loci may be found for each of the rays. Such loci may be used to determine a single site location. For example, it may be possible to use this technique to determine a location of a mobile user, and such a determination may be made by using data that may be obtained from a single device or receiver. A $4^{th}$ generation system may have receivers and/or mobile devices that may be equipped with one or more antenna arrays. Single site location techniques may be implemented using information from a single ray, for example, by combining TOA techniques with Angle of Arrival (AOA) techniques. Such a combination of techniques may also be used to enhance an accuracy of a location estimation.

An embodiment of the invention uses a trilateration principle that may rely on TOA information. In a free space environment, a propagation delay, $T_i$, may be a time of a signal from a moment of transmission until reception. A propagation delay may depend on a geometrical distance between a transmitter and a receiver, and may be given by $$T_i = \frac{1}{c}|r_m - r_i| = \frac{1}{c}\sqrt{(x_m - x_i)^2 + (y_m - y_i)^2 + (z_m - z_i)^2}$$

where $r_m$ may be a coordinate vector of a mobile device that may be given in, for example, a Cartesian coordinate system by $(x_m, y_m, z_m)^\tau$, and $r_i$ may be $r_i = (x_i, y_i, z_i)^\tau$, where $r_i$ may be a coordinate vector of an $i^{th}$ measurement device. A speed of light may be represented by c, e.g. $c=3\times10^8$ meters per second. A propagation delay, $T_i$, may be measured directly by a receiver, and a loci of all points, $r_m$, that may be at a distance $cT_i$ from an $i^{th}$ measurement device may be a sphere of a radius $cT_i$ and may be centered at a receiver location $r_i$. An intersection of a plurality of spheres, e.g. 4 spheres, may determine a location of a mobile station in space unambiguously.

Propagation delay may be measured directly in an embodiment where a time of transmission may be known at a receiver. Synchronization may be necessary between a transmitter and a receiver, and such synchronization may not always be available, in particular when sensors may be used that may be external to a communications system, e.g. a cellular system. Such sensors may not necessarily be synchronized with a system on which it may operate in conjunction. In some embodiments such sensors may be synchronized among each other, and not necessarily synchronized with a system, and such sensors may comprise receivers that may measure times of arrival of a same transmission to each of them. $T_i$ may denote a time of arrival of a transmission that may be transmitted at an unknown time, $T_{tx}$, with respect to a system clock. A time of arrival may be found by $$T_i = T_{tx} + \frac{1}{c}|r_m - r_i| = T_{tx} + \frac{1}{c}\sqrt{(x_m - x_i)^2 + (y_m - y_i)^2 + (z_m - z_i)^2}$$

An absolute time of arrival may be biased, with an unknown $T_{tx}$, and a difference between any two times of arrivals, $\Delta\tau_{ij}=T_i-T_j$ for any pair (i,j) a constant bias may be cancelled out. In free space, a locus of a plurality points that may form a given time difference $\Delta\tau_{ij}$ may be a spatial half-hyperboloid, for which receiver locations, $r_i$ and $r_j$ may be foci. An intersection of four such hyperboloid surfaces may provide an unambiguous location of a mobile station. This may constitute a method of Time Difference of Arrival (TDOA).

In some embodiments, a propagation medium, an atmosphere and obstacles, e.g. buildings, vegetation and other objects, may interact with propagating electromagnetic waves. A propagation of radio waves for scenarios applicable to, for example, cellular technologies has been studied, experimented, and described in text books and researches. Physical phenomena that may be involved when an electromagnetic wave may interact with matter may be absorption, refraction, reflection, diffraction and/or scattering. In a case where an electromagnetic wave propagates through matter some of its energy may be absorbed by such matter. This may be referred to as an absorption phenomenon. In a case where a wave may hit another matter, some of its energy may be reflected back, some of its energy may be transmitted through into another material, and may have another propagation direction. Each of these effects may be referred to as reflection and refraction, respectively. An amount of reflected energy and/or transmitted energy, as well as a direction of a transmitted wave may depend on actual properties of materials at an interface. If a wave may encounter an obstacle a wave propagation may be affected by a size of one or more obstacles, and may be in addition to being affected by a material. An obstacle may be larger than a wavelength of a signal, and a wave may pass around an obstacle, by, for example, diffraction. If a wave's length may be larger than an obstacle, a wave may be perturbed and it may scatter in a plurality of directions.

An exemplary embodiment of the invention comprises wireless communications, e.g. cellular communications, that may operate in frequencies that may be between approximately 700 MHz and 3000 MHz, and may be wavelengths that may range between 40 cm and 10 cm. A propagation medium may be lower layers of an atmosphere, and obstacles may be a ground, buildings and/or vegetation. Link distances may be between a few tens of meters and a few kilometers, or other ranges. A propagation phenomena that may relate to this case may be reflections from a ground and walls, diffraction around buildings and/or scattering from vegetation and from structures, e.g. buildings, which may be, by order of magnitude of tens of centimeters. Effects of absorption and/or refraction may be negligible. A resulting channel propagation model that may describe a resulting waveform may be a multipath channel. In such a model a radiating wave may undergo a set of reflections, that may be by buildings, walls etc. At a receiver a direct signal, that may not be obstructed, may be received together with delayed versions of it, which may propagate via reflection and/or diffraction at or around obstacles. Multipath may be considered in some applications as a destructive effect, which may deteriorate an accuracy of measurements. A further deterioration in some applications may be attributed to a shortest path taken may indicate a line of sight, e.g. a non-obstructed path.

An embodiment of the invention may use ray tracing techniques to predict different paths and a power of each ray, where a ray may be attributed to a propagating signal. A prediction may be used for measurement prediction estimation, and may be specifically for path prediction and location. Ray tracing may be performed by a number of known techniques, and may be based on a Uniform Theory of Diffraction (UTD). UTD may be a high frequency approximation to an exact solution of Maxwell equations in space. A spherical propagating wave may be described by a field intensity in space that may be given by:

$$\vec{E}(r, t) = \frac{\vec{E}_0}{|r|}\exp\left[j2\pi f\left(t - \frac{1}{c}i_k \cdot r\right)\right]$$

where $\vec{E}(r, t)$ may be a field vector in location r, as a function of time, $\vec{E}_0$ may be a field intensity at an origin, f may be a frequency of a wave, a vector $i_k$ may be a unit vector pointing to a wave propagation direction, and "·" may be a scalar product. According to a UTD model, an electromagnetic wave may be represented by a ray, in a direction of $i_k$. When a wave may reach an obstacle, it may reflect back from an obstacle surface, such that an angle between an incident ray and a surface may be equal to an angle between a reflected ray and a surface. An intensity of a wave may be given by a reflection coefficient, which may be a function of a type of material an obstacle may be made of and/or an orientation of electromagnetic field vectors that may be relative to an obstacle surface. Some energy of an incident ray may be reflected, and some of it may be absorbed within an obstacle. An obstacle may be thin, e.g. a building wall, and an electromagnetic wave may traverse a wall, and may still carry enough energy to be detected. Electromagnetic energy that may reach an obstacle may undergo diffraction and may reach a point behind an obstacle. An intensity of a diffracted field depends on an incidence angle of a wave, and may be relative to an obstacle edge and/or a diffraction angle, which may be an angle between a ray that may connect an obstacle edge and a point of measurement. A type of material and a shape of an obstacle may also make a difference for such a determination.

A ray tracing method may be described by referring to a ray launching method of implementation. In such a method, energy radiated from a source may be partitioned into rays, each traveling in a radial direction outgoing from it at a given spatial angle (θ,φ). Each ray may represent a spherical section wave of size (Δθ,Δφ) and may carry a part of a radiated power $P_t$ that may be given by:

$$P_{ray}(\theta, \phi) = P_t G(\theta, \phi) \frac{\Delta\theta\Delta\phi}{4\pi} \frac{W}{m^2}$$

and may travel at a direction that may be given, e.g. in Cartesian coordinates, by $$i_{\theta,\phi} = i_x \cos\phi\cos\theta + i_y \cos\phi\sin\theta + i_z \sin\phi$$

where $G(\theta,\phi)$ may be the antenna directional gain at the spatial angle direction (θ,φ).

A ray tracing algorithm may trace each ray that may start along its $i_{\theta,\phi}$ direction, and may change its path according to obstacles it may encounter. For example, an obstacle may be a planar surface, or an approximation of a planar surface by using a small area approximation of any surface, for which a direction vector, that may be perpendicular to a plane, may be given by $i_p$. A reflected wave field intensity may be described by:

$$\vec{E}_r(r-r_0) = \frac{\vec{E}_r(r_0)}{|r_0| + |r-r_0|} \exp\left[-j\frac{2\pi f}{c} i_r \cdot (r-r_0)\right]$$

where $\vec{E}_r(r-r_0)$ may be a reflected wave field vector at location r, and $r_0$ may be an incidence point. A dependence on time may be omitted for convenience, in some embodiments. A reflected wave direction vector $i_r$ may be given by:

$$i_r = (-i_i \cdot i_p) i_p - [i_i + (i_i \cdot i_p) i_p]$$

and its power may be given by:

$$\vec{E}_r = R^\perp \vec{E}_i^\perp + R \vec{E}_i$$

where $\vec{E}_i^\perp$ may be a field intensity component that may be perpendicular to a surface, and $\vec{E}_i$ may be a component that may be parallel to a surface. Reflection coefficients, $R^\perp$ and $R$ may be given by:

$$R^\perp = \frac{\sin(\Phi) - \sqrt{\eta - \cos^2(\Phi)}}{\sin(\Phi) + \sqrt{\eta - \cos^2(\Phi)}} \text{ and}$$

$$R = \frac{\eta\sin(\Phi) - \sqrt{\eta - \cos^2(\Phi)}}{\eta\sin(\Phi) + \sqrt{\eta - \cos^2(\Phi)}}$$

where $\eta = \epsilon_r - j \cdot 18 \cdot 10^9 \sigma/f$ may depend on a material. $\epsilon_r$ may be a relative dielectric constant of a material, σ may be a conductivity of a material surface, and may be given in Siemens/m).

Similarly, for diffraction over a wedge of angle nπ a diffracted wave electric field $\vec{E}_d$ may be given by:

$$\vec{E}_d = \vec{E}_r \frac{\exp\left(-j\frac{2\pi f}{c}s_1\right)}{s_1} D^\pm \sqrt{\frac{s_1}{s_2(s_1+s_2)}} \exp\left(-j\frac{2\pi f}{c}s_2\right)$$

where $s_1$ may be a distance of a diffraction point from a ray source, e.g. a wave radius of curvature, $s_2$ may be a distance of a diffraction point to a measurement source, $s_2 = |r-r_0|$. Diffraction coefficients may depend on a field orientation, and may be given by:

$$D^\pm_\parallel = \frac{-\exp(-j\pi/4)}{2n\sqrt{2\pi k}} \left\{ \begin{array}{l} \cot\left(\frac{\pi + (\Phi_2 - \Phi_1)}{2n}\right) \cdot F(kLa^+(\Phi_2 - \Phi_1)) + \\ \cot\left(\frac{\pi - (\Phi_2 - \Phi_1)}{2n}\right) \cdot F(kLa^-(\Phi_2 - \Phi_1)) + \\ R_0^\parallel \cdot \cot\left(\frac{\pi - (\Phi_2 + \Phi_1)}{2n}\right) \cdot F(kLa^-(\Phi_2 + \Phi_1)) + \\ R_N^\parallel \cdot \cot\left(\frac{\pi + (\Phi_2 + \Phi_1)}{2n}\right) \cdot F(kLa^+(\Phi_2 + \Phi_1)) \end{array} \right\}$$

where $$F(x) = 2j\sqrt{x} \cdot \exp(jx) \int_{\sqrt{x}}^\infty \exp(-jt^2) dt$$

may be a Fresnel integral, and:

$$L = \frac{s_1 s_2}{s_1 + s_2}$$

$$a^\pm(\beta) = 2\cos^2\left(\frac{2n\pi N^\pm - \beta}{2}\right)$$

$$\beta = \Phi_2 \pm \Phi_1$$

$$N^\pm = \text{round}\left(\frac{\beta \pm \pi}{2n\pi}\right)$$

where $\Phi_1$ may be an angle between an incident ray and a first surface of a wedge, and $\Phi_2$ may be an angle between an incident ray and a second surface of a wedge. A diffracted wave may not follow a single ray direction, as may be reflection from a planar surface, and may continue in a set of directions in a plane of an incident wave. Ray splitting may be required to follow further a wave's various paths.

Ray splitting may be used to describe scattering phenomena. As scattering may involve a distortion of a wave front, a ray may be split at a point of scattering to rays that may travel at different directions, where each may carry a smaller fraction of an electromagnetic power. An accuracy of a ray tracing technique may depends on a resolution that may be applied, for example a number of rays launched from a source, as well as rays that may be split at point of diffraction or scattering. A larger the number of rays may correspond to a higher total computation load, and heuristic trimming mechanisms may be typically applied to reduce them. Such methods may include trimming by power, by total path length, and/or by irrelevant directions, or other methods. A result of a ray tracing process may be a list of rays per possible reception point. For each ray a power it carries, a distance it may travel and/or an angle of arrival at a destination may be found. A reciprocity principle may allow a same process to be applied that may start from a receive point and may be toward a transmit point.

A resulting list of rays may be used to constitute a power delay profile and/or a power angle profile of a particular propagation channel. A power may be expected to be received as a function of delay and angle. Phase information of each ray may not be available as it may require geographical database accuracy on an order of magnitude of a fraction of a wavelength, e.g. about 1 cm accuracy or better for a typical cellular signal. A relative velocity between a mobile station and an environment may be known to calculate a phase accurately.

In an embodiment of the invention a range measurement may be made by a receiver, e.g. a cellular receiver. A signal r(t) may denote a received signal at a sensor. There may be a plurality of methods that may be used to measure a signal delay, and may be relative to a reference time. Accuracy, relative to a mean square error, of a delay measurement of a signal with bandwidth $B_f$, embedded in noise may be given by:

$$\sigma_d = \frac{1}{B_f \sqrt{SNR}}$$

where SNR may be a signal to noise ratio at which a signal may be received. $\tau_s = 1/B_f$ may be a basic resolution of a measurement. A signal, e.g. a cellular signal, that may pass through a multipath channel, may arrive at a receive antenna as a convolution of a transmitted signal s(t) and may be with a channel impulse response h(t), and may be together with noise:

$$r(t) = \int_{-\infty}^{\infty} s(t-\tau)h(\tau)d\tau + n(t)$$

A channel impulse response may be given by a multipath model as:

$$h(t) = \sum_{l=0}^{L-1} a_l \delta(t - \tau_l)$$

where $\alpha_l$ may be a field intensity, that may include a phase of an $l^{th}$ ray, and $\delta(t-\tau_l)$ may be an impulse delayed by $\tau_l$. An angle dependence may affect a phase by which a signal may be received at each receive antenna, and may be ignored for simplification of a derivation.

A measurement process may be a de-convolution type process, which may be distinguished according to a signal transmitted and a receiver capability. In a case where a signal may be a narrow bandwidth signal, and may be defined as $1/B_f > \tau_i - \tau_j$ for each pair (i,j), various delays may not be resolvable. Each signal that may arrive at a receiver via different paths may interfere with each other and may result in a single signal, that may have an equivalent spread of:

$$\tau_{eq} = \sqrt{\tau_s^2 + \tau_{rms}^2}$$

where $\tau_{rms}$ may be a signal channel delay spread that may be given by:

$$\tau_{rms}^2 = \sum_l^{L-1} P_l \tau_l^2 - \tau_{avg}^2$$

where $$\tau_{avg} = \sum_n P_n \tau_n$$

may be an average delay, and coefficient $$P_l = \frac{|a_l|^2}{\sum_{l=0}^{L-1} |a_l|^2}$$

may be partial power in each ray, and may be normalized to the total power. A delay measurement accuracy may then be:

$$\sigma_d = \frac{\tau_{eq}}{\sqrt{SNR}}$$

Resulting from such interference, a received signal amplitude may not be constant, but rather may be a random variable, which may be distributed according to a distribution, e.g. a Rician distribution function, and may depend on whether a signal that may be received may have a significant line-of sight component. An average accuracy can be computed according to:

$$\sigma_d = \int_0^{\infty} \tau_{eq} \exp\left(-\frac{r^2 + |a_0|^2}{2}\right) I_0(r|a_0|) dr$$

where $|\alpha_0|$ may be an amplitude of a SNR of a first line of sight component, if it exists, and $I_0$ may be a Bessel function of a second kind of order 0. In a case of no direct line-of-sight signal existing, and a Rayleigh fading signal, may be produced, an average range measurement accuracy may becomes a constant, and may be independent of a SNR:

$$\tau_{eq}\sqrt{\frac{\pi}{2}}.$$

In an embodiment where a signal may be a wide bandwidth signal, some rays may be resolvable. A resulting response may be partitioned, for example into clusters. Each cluster may consist of a small number of rays. An accuracy of each cluster may be given by:

$$\sigma_d = \frac{\tau_{eq}}{\sqrt{SNR}}$$

where a channel delay spread per cluster may be calculated as per:

$$\tau_{rms}^2 = \sum_l^{L-1} P_l \tau_l^2 - \tau_{avg}^2$$

with L being a number of rays in a cluster. A resulting amplitude distribution may be a Rician distribution, however as a number of rays in a cluster may not be large, there may be a good probability that a strong reflection may dominate a received signal, and thus produce a Rician distribution that may have a larger K factor per cluster, which may further enhance an estimation accuracy of a delay of each cluster.

An exemplary embodiment of the invention may comprise operation in a system, for example a cellular system. A bandwidth of a first generation cellular systems, e.g. Advanced Mobile Phone System (AMPS) or a second generation digital AMPS (D-AMPS) system may be 30 kHz, and may provide a resolution power of approximately 33 microseconds. A received signal may resolve scatterers that may be separated by greater than 10 km. A range measurement capability in such systems may be poor. For a GSM signal, of which a bandwidth may be 200 kHz a receiver may resolve rays that may arrive at a 1500 m difference. An urban environment channel model may predict a delay spread of approximately 0.4 microseconds, which may result in an equivalent resolution of 1510 m. A line of sight non-dispersive channel, with a signal to noise ratio of 20 dB, may produce measurements with an accuracy of 150 m. A UMTS signal that may have a 5 MHz bandwidth, may have an expected resolution of an order of magnitude of 60 m. An expected $4^{th}$ generation system that may have a bandwidth that may range between 5 MHz and 40 MHz may achieve a 7.5 m resolution.

In an exemplary embodiment of the invention, a type and quality of a resulting measurement may depend on a sophistication of a sensor. At least three types of sensors may be distinguished. A first type may be a single reading sensor, which may return a single delay value, and may correspond to a shortest path, e.g. a line of sight, or a strongest reflection. A second type may be a multi-reading sensor, which may resolve and return several values, and may correspond to several cluster scatterers. This second type of sensor may be obtained, for example, from a UMTS rake receiver. A third type may be a multi-antenna sensor, which may have an antenna array. This third type of sensor may also estimate and resolve rays by angle of arrival.

Figure 5:
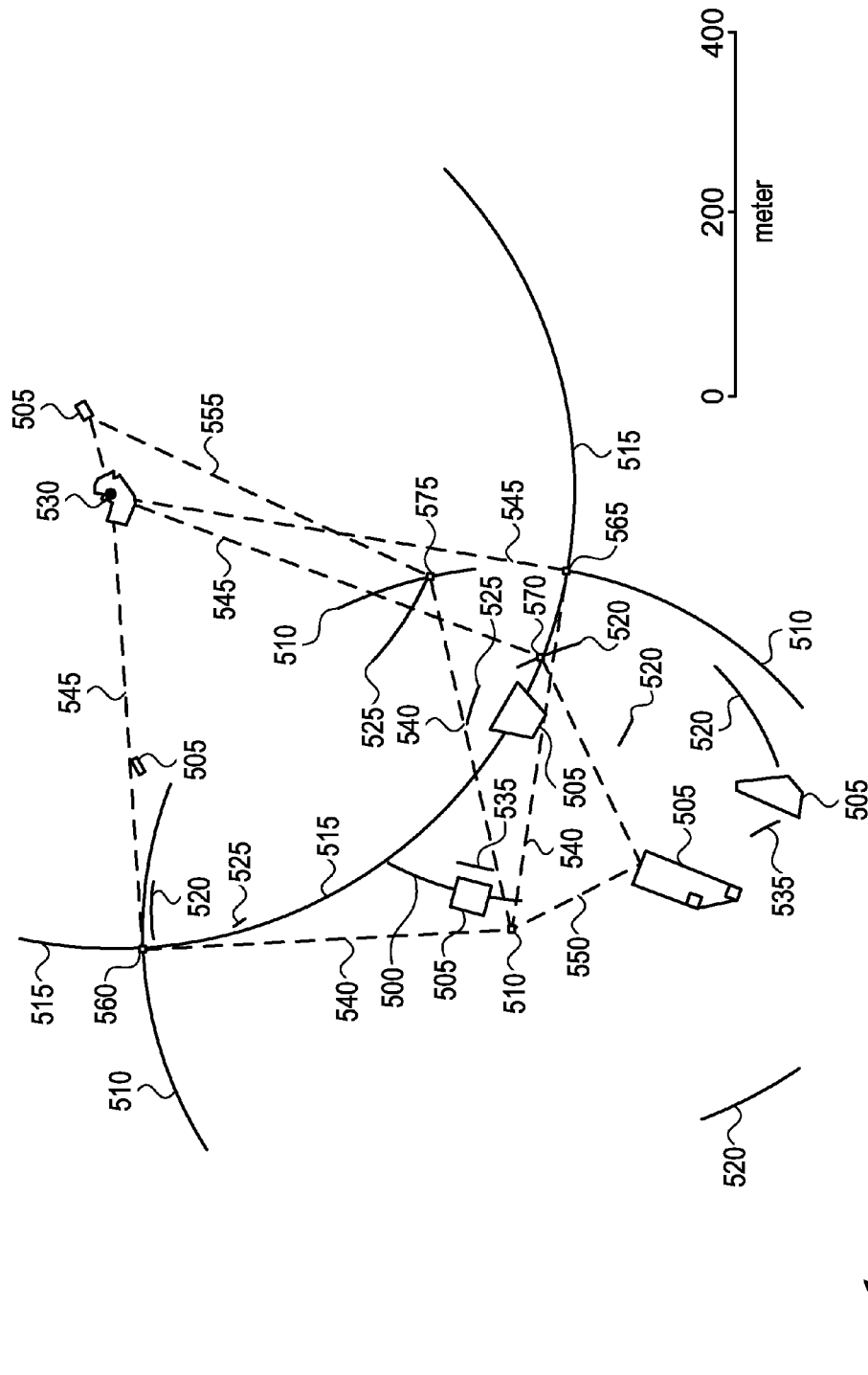
FIG. 5 depicts an exemplary diagram according to embodiments of the present invention.

Another embodiment of the invention may be a method of location estimation that may be based on ray tracing and/or results of ray tracing methods. From propagation delay measurements, that may be either single value or multi-ray values, a location may be found, as described above, by using a TOA method, for example, if delay measurements may be absolute, or by a TDOA method, for example, if measurements may be relative. A measurement value may be allocated to a direct ray, a reflected ray or a diffracted ray. A set of measurements that may be accumulated from one or a plurality of sensors may be used to find an exact location. Such a process may be explained by reference to FIG. 5, may be for two single range sensors, and may use a TOA method within a build-up environment 500. Building contours may be denoted by 505. Two sensors 510 and 530 may be used and may produce two readings, e.g. 400 m and 500 m respectively. An equi-range loci for two sensors for those measurements may also be determined. A resulting loci may not be continuous, and may be due to a presence of obstacles, and may comprise several non-contiguous segments. Segments that may be denoted by 510 may be direct line-of sight loci from sensor 510, and may lie on a circle around a sensor of which a radius may be 400 m. Segments that may be denoted by 520 may be a result of a single reflection from a potential mobile unit that may be located over a segment, and its transmission propagated through one of the buildings' walls, to a sensor 510. Similarly, segments denoted 535 may be loci of double reflection paths. Other loci that may result from diffraction, may also exist but may be omitted from the figure for clarity. A signal strength of a diffracted wave may be much lower than those received by reflections. An equi-distance, e.g. 500 m, locus of points from sensor 530 may comprise multiple segments. Segments 515 may be direct line-of sight loci, segments 525 may be single reflection loci and other segments may be double reflection loci. Intersection points of a locus, e.g. a 400 m distance locus, from sensor 510 with a locus, e.g. a 500 m distance locus, from sensor 530 may be a candidate location of a mobile unit. This exemplary depiction shows four such intersection points that may have been made. Two of those 560 and 565 may be a result of a direct ray intersection. Two other intersections 570 and 575 may be an intersection of a direct ray with a reflected ray. Direct rays from each sensor to those points may be depicted as well and denoted 540 and 545 respectively and reflected rays that may reach points 570 and 575 may be denoted by 550 and 555 respectively.

A difficulty of mobile location may be ambiguity. In an exemplary embodiment shown by FIG. 5 there may be four such ambiguous points. This difficulty may become more severe in a denser environment, and/or in a three dimensional scenario, that may include ground reflections. Several means may be used to resolve ambiguities. A first exemplary method may be to use additional sensors. An intersection of loci of several sensors may reduce a level of ambiguity. A determination may need to be made with regard to a number of sensors, and may or may not be made prior to an initial measurement. A second exemplary method may be use of a sensor that may be capable of angle measurements. Then an angle of arrival line may provide an additional indication of a correct location. A third exemplary method may be use of signal strength filtering. Although range may be a factor in a propagation loss calculation, a propagation path and phenomena, e.g. diffraction, scattering etc., may result in different signal strength values, for example for each sensor, at each candidate point. By ray tracing, it may be possible to determine dominant rays per point, and hence improve an accuracy of a signal strength estimation per candidate. An angle of arrival, even if not measured directly, may be considered as a signal strength spatial filter in a sense that signals that may arrive from a directional antenna boresight may be stronger than those that may arrive at different angles. Thus a signal strength, in addition to a path loss, may be used to determine a correct location. Other methods, for example triangulation, may be used.

Figure 6:
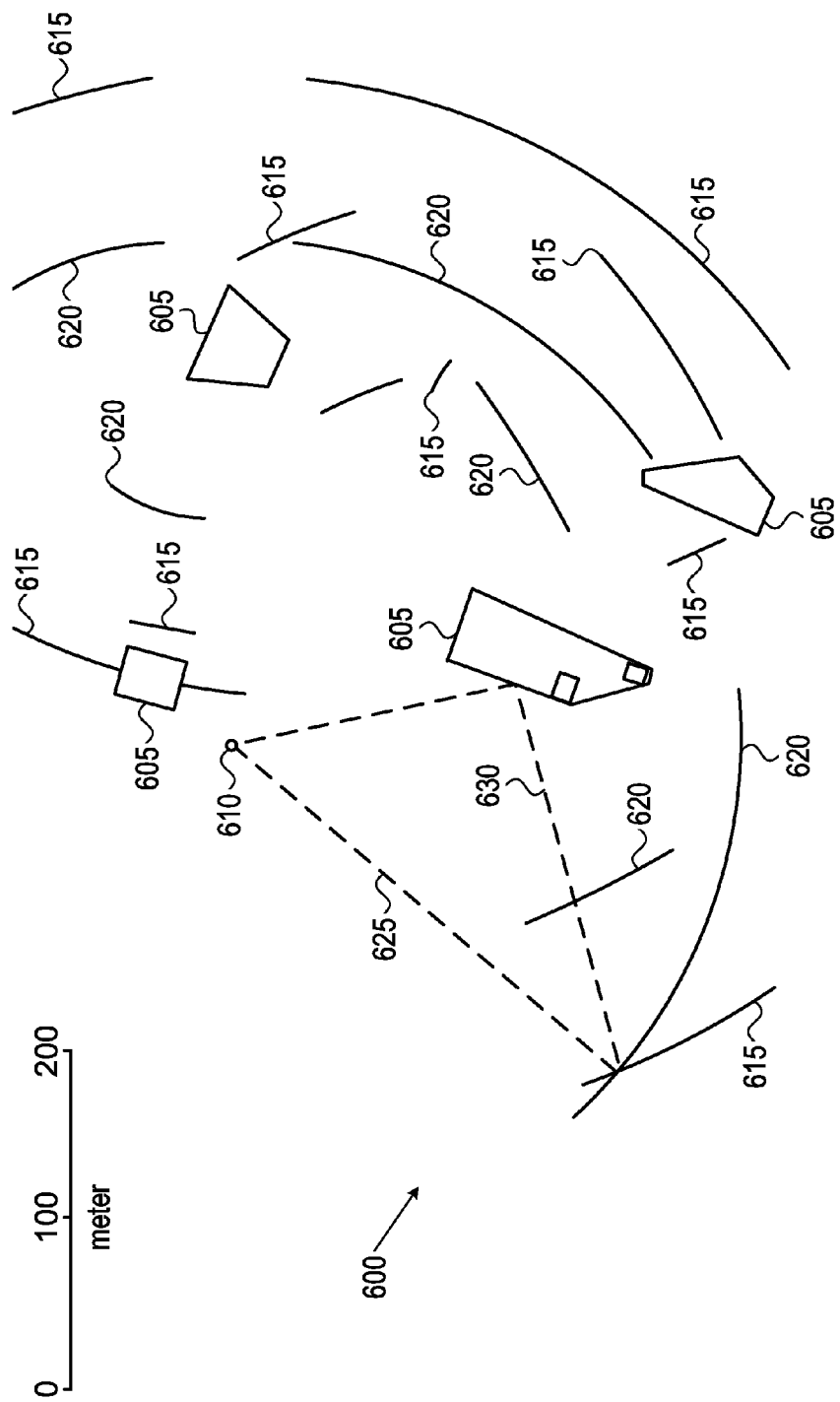
FIG. 6 depicts an exemplary diagram according to embodiments of the present invention.

An embodiment of the invention where a multi-reading sensor may be used 600 may be shown by reference to FIG. 6. A capability to locate a mobile station using a single site may be provided. With reference to FIG. 6, a sensor 610 may be located near buildings 605. Equi-distant loci, e.g. 400 m 615 and 400 m 620 may be found. An intersection of these loci may be at a single point, which may be an intersection of a direct ray 625 and a reflected ray 630.

Figure 7:
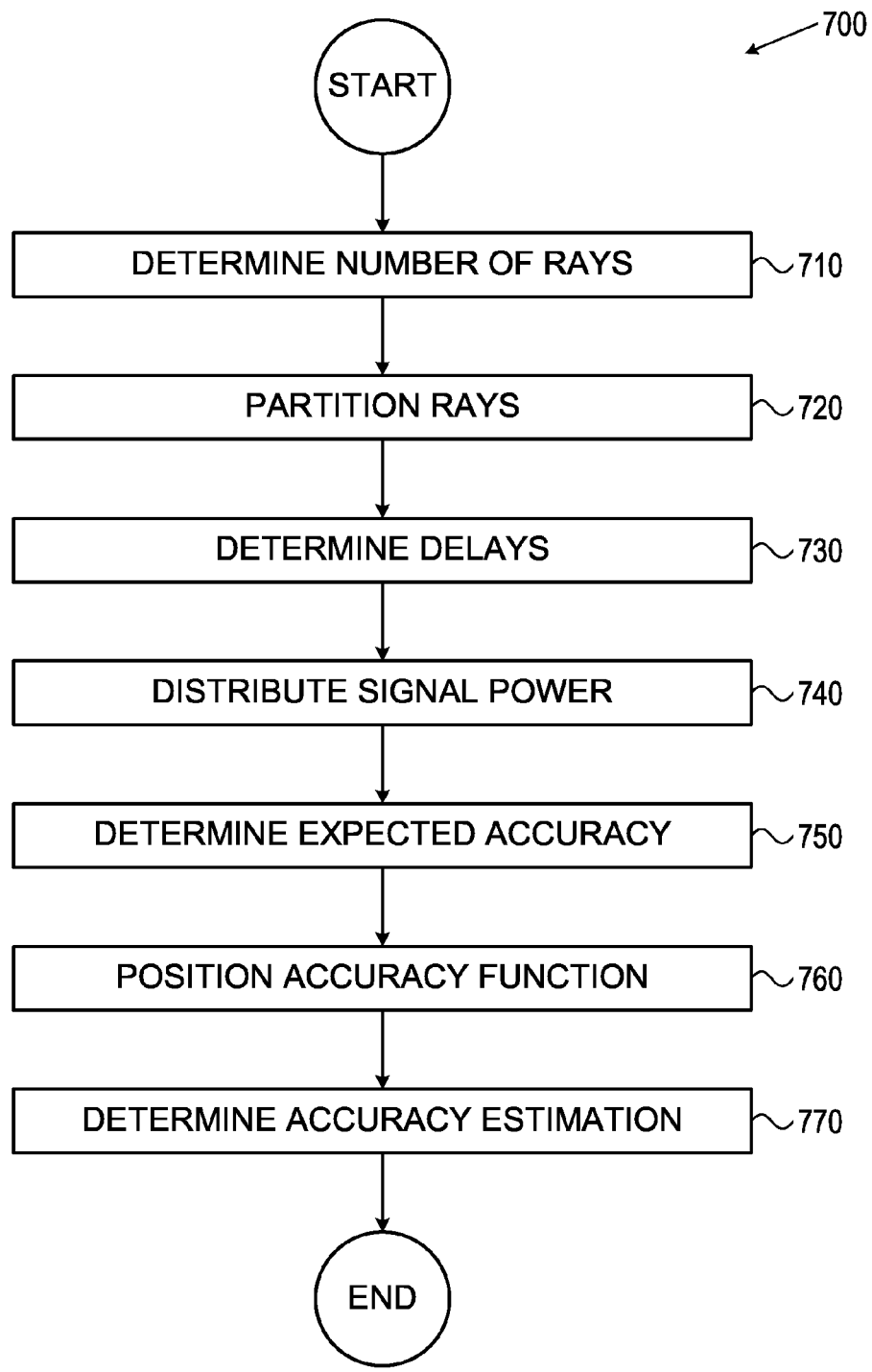
FIG. 7 depicts a method according to embodiments of the present invention.

An embodiment of the invention may be a method for estimation of accuracy of a location determination. An accuracy of a location process may depend on a range measurement accuracy as described above, but also may depend on a geometrical configuration of an intersection point. This may be referred to as a "geometric depletion of precision" (GDOP). A main difference may be a determination of range accuracy. A procedure 700 for location accuracy estimation is described below, and by reference to FIG. 7. A candidate intersection point may be determined, and for each, a determination of a number of rays that may arrive at a particular point from each sensor may be made 710. Each ray may be partitioned into clusters 720, and may be according to a signal and/or a sensor resolution. In each cluster rays that may arrive from a similar direction, for example as may be observed from an angle of arrival that may be calculated by a ray tracing algorithm, may be grouped together. For each cluster a deter mination may be made of an average delay 730, and a delay spread of a cluster, for example according to:

$$\tau_{rms}^2 = \sum_{l}^{L-1} P_l \tau_l^2 - \tau_{avg}^2$$

Statistics of an expected signal amplitude may be determined as well. Thus, if an arriving ray may be stronger than another, it may be a Ricean Distribution. Otherwise it may be another distribution, e.g. a Rayleigh distribution. Received signal power, as may be measured by a sensor, may be distributed to clusters 740, and may be according to each cluster's relative power. An expected range measurement accuracy may be determined 750 according to:

$$\bar{\sigma}_d = \int_0^\infty \tau_{eq} \exp\left(-\frac{r^2 + |a_0|^2}{2}\right) I_0(r|a_0|) dr$$

by: $\sigma_r = c\bar{\sigma}_d$. An accuracy function, e.g. an ellipse, may be positioned 760 according to a cluster ray direction. A ray direction may be described by a vector $i_r$, and an azimuth and elevation directions may be represented by vectors $i_\theta$ and $i_\phi$ respectively, a variance matrix may be represented by:

$$\Sigma = U\Lambda U^\tau$$

where $$\Lambda = \begin{bmatrix} \sigma_r^2 & 0 & 0 \\ 0 & \sigma_\theta^2 & 0 \\ 0 & 0 & \sigma_\phi^2 \end{bmatrix}$$

may be a variance matrix in $i_r$, $i_\theta$, $i_\phi$ coordinate systems and U may be a transformation matrix between such a system and a common coordinate system. An error along an angular axis may be determined, by default, by an antenna beamwidth, and/or by an antenna array measurement accuracy, if such an array may exist. In a common coordinate system a probability density function of a location that may be given by a measurement $\hat{r}$ may be given by:

$$f_r(r) = \frac{1}{(2\pi)^{\frac{3}{2}} \det(\Sigma)} \exp\left[-\frac{1}{2}(r - \hat{r})^\tau \Sigma^{-1}(r - \hat{r})\right]$$

A combined probability density function of a set of N intersections may be given by:

$$f_N(r) = \prod_{i=1}^{N} \frac{1}{(2\pi)^{\frac{3}{2}} \det(\Sigma_i)} \exp\left[-\frac{1}{2}(r - \hat{r}_i)^\tau \Sigma^{-1}(r - \hat{r}_i)\right]$$

where $\vec{r}_i$ may be an estimation that may be given by sensor i, and $\Sigma_i$ may be an estimation variance matrix that may be computed according to:

$$\Sigma = U\Lambda U^\tau$$

This probability density function may be used to determine an accuracy estimation 770.

In some embodiments of the invention, synchronization may be performed. A delay measurement mechanism may require synchronization among sensors. When a TOA technique may be used, synchronization between a sensor system and a mobile terminal clock may also be required. A root mean square deviation between sensor clocks, or, for example, a sensor and a mobile terminal clock, may be given by $\tau_{sync}$. An equivalent error:

$$\tau_{eq} = \sqrt{\tau_s^2 + \tau_{rms}^2}$$

now becomes:

$$\tau_{eq} = \sqrt{\tau_s^2 + \tau_{rms}^2 + \tau_{sync}^2}$$

Using this function, a delay error calculation as above may now be calculated using an equivalent delay error. Synchronization may be achieved by a plurality of methods. For example, a Global Positioning System (GPS) device may be used as a part of a sensor network to synchronize sensors. Or, if sensors may be connected to a network, e.g. a cellular network, synchronization source, a synchronization may be achieved by a cellular network synchronization. Another example may be use of a separate synchronization system, e.g. as outlined by a standard such as an IEEE 1588 standard.

Figure 8:
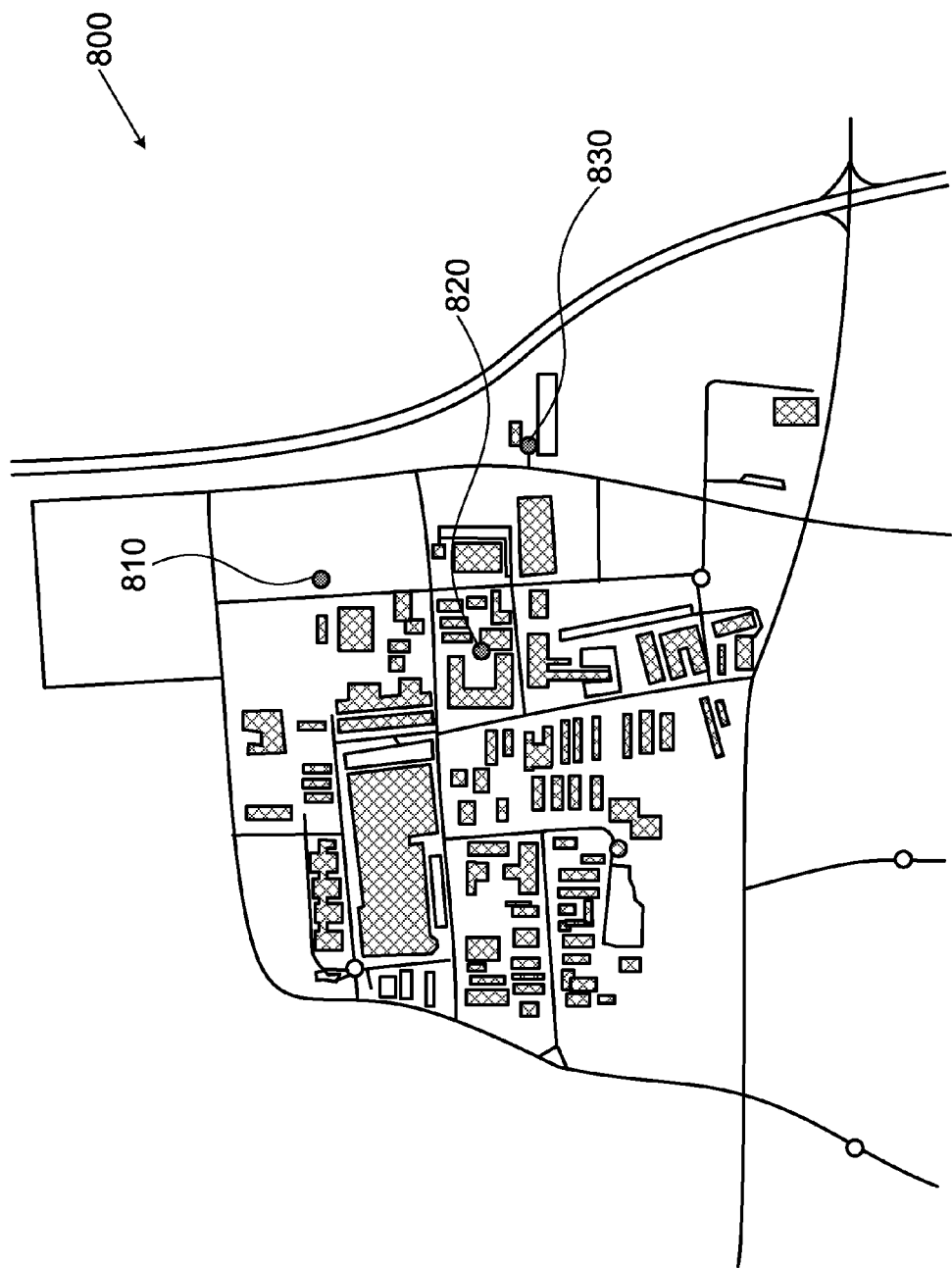
FIG. 8 depicts an exemplary diagram according to embodiments of the present invention.

An exemplary embodiment of the invention was tested by simulation, and may be shown by reference to FIG. 8. FIG. 8 may be a reference map 800 of an area over which a simulation was performed. A description of this area may be an industrial/urban area, with buildings of up to ten floors as well as low workshops, garages etc. A simulation includes three omni-directional sensors, of which sites are denoted by 810, 820 and 830 in the figure. An exemplary simulation uses a grid of 1700 m by 1300 m points, spaced 50 m apart, where such grid may be at ground level. Ray tracing may be used, and a list of rays, including a path length and a power for ray may be computed from each point to each sensor, in a plurality of combinations. Range measurements taken may be a shortest path that may be reported by a ray tracing result, and a signal strength measurement may be taken as a received signal strength of a corresponding path, e.g. a single reading sensor simulation. A measurement process may be simulated by adding to a reported range a random error, for example a normally distributed error that may have a varying standard deviation, and by adding a random error, that may be normally distributed, e.g. in dB, to a received signal strength measurement. Measurements may be used to determine a location estimate. The following table may show a median location error, (in meters) as a function of a range error standard deviation and a prediction error standard deviation, for a case where two sensors may have been used.

|  |  | Prediction std (dB) | | | | |
| --- | --- | --- | --- | --- | --- | --- |
|  |  | 15 | 12.5 | 10 | 7.5 | 5 |
| RANGE | 48.0 | 140 | 132 | 127 | 124 | 123 |
| std (m) | 24 | 92 | 86 | 81 | 78 | 77 |
|  | 16 | 78 | 73 | 69 | 67 | 65 |
|  | 12 | 73 | 69 | 65 | 62 | 60 |
|  | 9.6 | 70 | 66 | 62 | 59 | 57 |

The following table may show a median error for a case of three sensors. A median was taken over 10000 cases.

|  |  | Prediction std (dB) | | | | |
|---|---|---|---|---|---|---|
|  |  | 15 | 12.5 | 10 | 7.5 | 5 |
| RANGE | 48.0 | 92 | 90 | 87 | 86 | 86 |
| std (m) | 24 | 61 | 59 | 57 | 56 | 55 |
|  | 16 | 53 | 51 | 48 | 47 | 46 |
|  | 12 | 49 | 47 | 45 | 43 | 42 |
|  | 9.6 | 48 | 45 | 43 | 41 | 40 |

The first entry in each table, e.g. 140 m for two sensors in the first table, and 92 m for three sensors in the second table, may be results expected by other techniques. By using a geographical database, both a range accuracy and a prediction accuracy are expected to improve, and may result in a reduced error.

In some embodiments there may be steps that may be performed prior to real-time operation that may include creation of a database, as described above. A schematic depiction of a database 900 may be represented by reference to FIG. 9. Data may be collected that may be relevant to a geographic area where location measurements and determinations, as described above, may be made. Data may be collected in three dimensions, e.g. for specific spatial location. Data items may be specific geographic information 910 that may include terrain features, e.g. topological features, dimensions and relative and absolute positions. Other specific data may be included, e.g. terrain height and land use information. Such geographic data may be available from mapped information or may be gathered specifically for a measurement application herein. Data items may be specific information about artificial structures 920 and may include location information that may be obtained from maps, e.g. survey maps. Artificial structural information may include specific characteristics of a structure, e.g. building height, footprint dimensions, number of floors, etc. Other specific data may be included, e.g. building contours. Structural information may include information about materials and RF properties of materials, e.g. absorption, refraction, reflection, diffraction or scattering coefficients, as described above. Elements of information may be specific to a structure, for example a building with multiple floors may have information that may be specific to each floor, and may form a part of a three dimensional database. Measurements may be made within a structure, e.g. indoor range measurements, or outside a structure, e.g. outdoor range measurements. For both geographic information 910 and artificial structure information 920 a database may include a list of rays from each LMU and each base station. Ray information may be gathered prior to operation of an embodiment of the invention, and may be stored for use during operation. Signals may be transmitted from one or more base stations and return signals may be correlated with cartographic information and/or structural information, where such correlated information may form a part of a database. Signals may be received by sensors that may be single-reading sensors, and range information and delay spread information may be stored together and may be compressed for storage, where such compression may depend on a method of database storage and/or access. Signals may be received by sensors that may be multi-reading sensors, and range information and delay spread information may be stored together and may be compressed for storage, where such compression may depend on a method of database storage and/or access, or such compression may depend on a resolution of a signal that may result from a number of measurements that may be provided by sensors. Range vectors and/or signal strength vectors may be determined and stored in a database.

Network configuration information 930 may be any available information about a network that may be communicating with wireless devices. Network information 930 may include network features, for example configuration information, and may include details of network component connectivity, both hardware connectivity and software connectivity. A location of each base station and each LMU may be included in network configuration 930, and a location may be a physical location or a virtual location that may be based on connectivity. Other network configuration information may also be included. Information about each antenna 940 that may be used to receive signals from wireless transmitters may be available, and may include a height, type and/or an orientation of each antenna. Other antenna information may be included.

Geographical information 910, building data 920, network configuration information 930 and antenna information 940 may be used by an RF prediction calculator 950 to create a database of information that may apply to an area that may be covered by a system for communicating with wireless devices, e.g. a cellular system, where locations of such devices may be desired to be known. An entire system area may be covered. An RF prediction calculator 950 may use any known technique to categorize and organize information that may be collected. An RF prediction calculator may operate prior to operation of a location finding method, or may operate during a location determining operation. Data may be collected prior to, or during, a searching function. A database may be an RF prediction database 960, and may include information about signals that may be received by wireless devices, for example rays from each LMU and each base station. Rays may be stored in a list, or any other format. During a determination of a location of a wireless device, a query may be received and a location engine may search an RF prediction database 960 for a matching set of information, e.g. a best fit range vector and/or a signal strength vector, for a received set of measurements. A location calculation engine may operate as described above. Other searches for other matching information may be performed.

A prediction of radio or wireless signal strength may be based on measurements of such strength that may be gathered at one or more measurement points. A radio wave propagation model may be used to aide in prediction of signal strengths. Actual measurements may be used to enhance a model, and may result in an improved model that may more closely depict actual environmental conditions. Such an enhanced model may be used for signal strength predictions in areas where actual signal strength measurements may be lacking, or otherwise unavailable. A method for developing such an enhanced model may be used, and may be described herein, and may be referred to as a model calibration method, or calibration method. A model of an environment may be constructed, where such model may be physically based, mathematically based, or based on other modeling principles. Obstacles and/or other physical parameters may be identified and may form parts of a model. A model may be used as a propagation model for radio wave propagation in order to predict signal strengths of such radio waves at various points within a region that may be described by a model. Signal strengths may be found at points where signal strength measurements may have been made, or at other points where signal strengths may be predicted by a model. Physical parameters, e.g. building locations, building heights, and other physical parameters, may be estimated, where such estimates may form a part of a model, and may be based on a set of measurements that may be made, e.g. field measurements. Field measurements may be made by a wireless system operator, or other entity that may have sufficient field measurement capability, e.g. a cellular network operator. Estimates of physical parameters may be adjusted based on field measurements, where such adjustments may be in accordance with a calibration method, and may result in a more accurate model of signal strengths and signal propagations across a region of interest.

Figure 10:
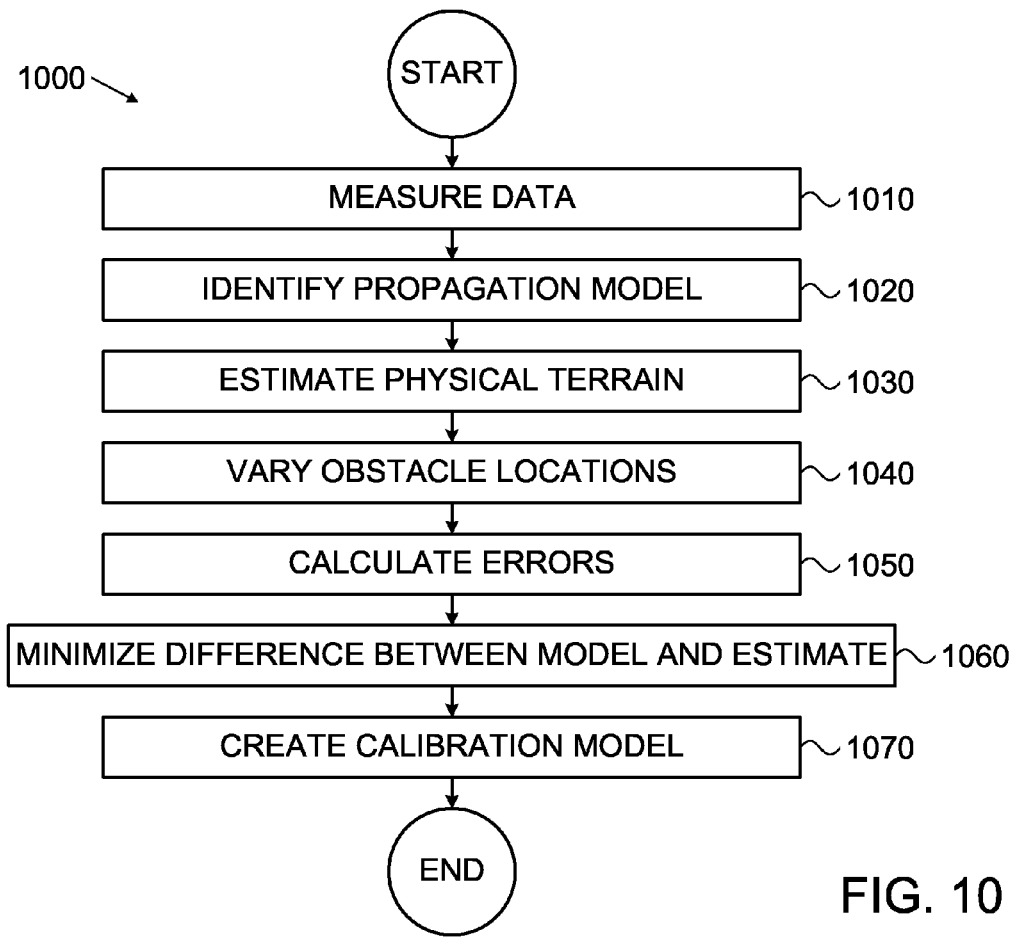
FIG. 10 depicts a method according to embodiments of the present invention.

A method 1000 for forming an accurate model, or calibrating a model, may be described by FIG. 10. Data may be measured 1010 in an actual environment, where such measurements may be made by various means, e.g. drive tests. Measured data may include signal strength measurements, and may be correlated to geographic location information of a measurement point. Signal strength measurements may be relative to a particular transmitter, e.g., a base station, or to a radio wave environment. A propagation model may be identified 1020 as an initial model that may be indicative of a measurement situation in an environment, and may be chosen as a model to be calibrated. Locations of physical terrain, e.g. buildings, hills, or other obstacles, may be estimated using an identified model as a basis, with a contribution of measured data. Obstacle locations may be varied 1040 within a model to best match a model to data measured from an actual environment, and errors between a modified model and measured data may be calculated 1050. Varying of obstacle locations within a model may continue until differences between a modified model and an estimate of predicted signal strengths are minimized 1060. Using results of obstacle locations after minimizing any differences, a completed calibration model may be created 1070. Various methods may be used for reconstruction of maps of obstacles, for example an Analysis by Profile method, a Gradient Search method, a Genetic Algorithm method, a Building Replacement method, or a combination of such methods. Other methods that may produce similar results may also be used, either alone or in conjunction with other exemplary methods mentioned herein. Some exemplary models that may be used may be a single knife-edge model, a multiple knife-edge model, a single wedge model, a rounded obstacle model, a diffraction model, e.g. diffraction around buildings, a vegetation inclusive model, a ray tracing model, a model calibrated by a mathematical process, e.g. regression, a combination of such models, or a combination of such models with other models.

An exemplary environment may be mobile wireless communication, which may use radio waves of a defined wavelength, e.g. 5-20 cm in length. Radio waves may propagate in an urban or a suburban environment, and may be affected by factors, for example reflection, diffraction and/or scattering, and may be from objects, e.g. buildings, vegetation, vehicles, power lines, or other objects. An accurate radio strength prediction may rely upon a location of each object that may be known to within a certain accuracy, e.g. centimeter, as well as a type of material each object may be made of. Such information may not be available at a level of accuracy that may be desired. In order to overcome such difficulties, a plurality of models may be developed for use by radio planners. Such models may predict a signal strength based on available information and/or a set of assumptions about an environment. An exemplary model may be a dual slope model, which may take into account primarily ground reflections, and thus may give a prediction of a signal strength as a function of a distance between a transmitter and a receiver, a radio frequency, and/or antenna heights. Such a model may be applied in many cases where line-of-sight may exist between a receiver and a transmitter. Another exemplary model may be a HATA-Okumura model (Hata), which may be based upon measurements that may have been taken in a multitude of locations, e.g. cities, and in various conditions. Similar in fashion to another exemplary model, a dual slope model, this Hata model may give a prediction of signal strength as a function of a distance between a transmitter and a receiver, a radio frequency, and/or antenna heights. Such a Hata model may gives a result which may be typical to non-line-of sight propagation, and may be an average of measurements made in similar conditions in various locations, e.g. cities. Other exemplary models may be Bertoni, Walfisch-Ikegami, and Blaunstein's parametric models. Each of such models may be used for urban propagation, or similar environments, and may take into account such parameters as a gap between buildings, an angle of diffraction, a building density, or other related parameters. Any of these exemplary models may be used as a base model for model calibration.

Exemplary models described herein that may be used as a base model for a calibration method may not fully account for an actual environment, e.g. terrain height profiles and/or building locations. When such information may exist, predictions for a given point may be made more accurate, and such models as, for example, a knife-edge model, or ray-tracing, may be used. Such models may be physical models that may use known propagation mechanisms and/or wave interaction to predict received signal strengths. However, accuracy within such models, alone, may have limitations, and may be based on precise knowledge of physical object features. More accurate predictions may be achieved by using measurements check and to "calibrate" a model. For example, in cellular systems such measurements may be conducted on a regular basis, wherein specially made equipment may be used to collect a large set of strength measurements at a plurality of points, where each point may be a location where a signal that may be transmitted from one or more base stations may be received. Measurement instruments may also produce a measurement location as well as signal strength measurements, and such locations may be correlated to such measurements. Measurement locations that may be correlated to such measurements may be stored locally or remotely, and may be used to construct a database of measurements and associated location information. A calibration process may involve modifying model parameters in order to approximate, as much as possible measurement data. Various techniques may be used, for example, linear regression on each of the model parameters. Another exemplary technique may be Newton's method, in order to find optimal solutions, where such optimal solutions may be a minimum of a mean squared error between a model prediction and an actual measurement. With such a model, correlated and constrained parameters may also be calculated, and may provide an improvement over classical linear regression. Each of such exemplary methods may assume a certain model, which may not be directly related to a physical environment. Obstacles may cause a reduction of signal strength at a certain point, which may be attributed by a calibration process to another parameter, e.g. range, and may cause a less accurate estimation of signal strength for other points at the same range, which may not be obstructed. As such, a calibration method may account for such situations.

Prediction of signal strength may be prone to errors, and may be mainly due to lack of information about a propagation environment. Network operators, e.g. cellular network operators, may regularly conduct signal measurement campaigns, e.g. drive tests or walk tests. During such campaigns dedicated instruments may be used which may provide measurement point coordinates as well as strengths of signals that may be received at a measurement point arriving from, for example, a number of base stations. Such instruments may provide coordinates using a variety of means, e.g. Global Positioning System (GPS), or other navigational means. Drive test results may be used as an indication of signal strengths at measurement points. For points other than measured ones, a propagation model may be used. A model may be calibrated, and its parameters may be modified so that it may better fit to measurement points. A calibration process may enable use of a model for other points, when they may be at a location, e.g. a neighborhood, where a test, e.g. a drive test, may be made, and that they may be within a similar propagation environment. It will be recognized that the drive tests described herein are merely exemplary. According to embodiments of the invention, measurements of the signal strength, from which the path loss is derived, may be made using signals in the downlink direction, the uplink direction, or both the downlink and uplink directions. For example, the signal strength measurements may be collected at the base station, in which case, the transmitter is a mobile device for which the location is known, e.g., by GPS, while the receiver at the base station measures the signal strength. In another embodiment of the invention, measurements may be made both by a mobile device based on signals transmitted by the base station, and by a base station based on signals transmitted by the mobile device.

Calibration procedures may fit model parameters, e.g. mathematically, to measurements. An embodiment of the invention may use measurements, e.g. drive test measurements, to reconstruct a land use map, and may be used to estimate obstacle locations and/or heights, which may used for radio signal strength prediction by a physical model. An embodiment may be used to locate buildings, trees and/or other obstacles, which may or may not be charted, for example on a map. A need to purchase high-cost high-resolution and detailed maps for a purpose of radio planning may be avoided. Reconstructed obstacle maps may be used for prediction of signal strengths at other radio frequencies and/or at different antenna heights, as a physical propagation model may take those parameters into account. Thus, for example, once the obstacles are known, path loss may be recalculated, using equations such as Equation (1) and/or Equation (2) below, for any desired frequency. Accordingly, measurements in one frequency may be used to find the obstacle locations and, with this information, the appropriate calculations may be performed in another frequency. Similarly, this principle may be applied to different heights of the antennas, or the use of another model. That is, the obstacles may be discovered using one antenna height, and used for an antenna having a different height; the obstacles may be discovered using one model, and used in connection with a different model. Such techniques may be integrated with other information, e.g. information at other neighborhoods, and may extend a validity of a drive test.

Embodiments of the present invention may use data that may be collected from an environment to reconstruct building and/or object information, where this reconstruction may be performed in a virtual manner Reconstruction maybe performed by a processor, and may be performed within a computing device. Such reconstruction information may be stored in a memory.

An embodiment of the invention may use a method that may be referred to as a Profile Method. A method may assume a single knife-edge propagation model between two points. In such model, it may be assumed there may be a single obstacle between a transmitter and receiver. An obstacle may be located at a distance of $d_1$ from a transmitter and $d_2$ from a receiver. An obstacle may obstruct a line connecting a receiver and a transmitter, e.g. a line-of-sight, that may protrude by distance h above it. It may be noted that h may be a negative value, and may indicate that an obstacle may be close but may not be obstructing a line of sight. A path loss between a transmitter and a receiver may be given approximately by $$L_{path} = 20\log_{10}\left(\frac{4\pi d}{\lambda}\right) + 6.9 + 20\log_{10}\left(\sqrt{(v-0.1)^2+1} + v - 0.1\right) \text{ [dB]} \quad (1)$$

where:
$d=d_1+d_2$ may be a distance between a receiver and a transmitter, and $$v = h\sqrt{\frac{2}{\lambda}\left(\frac{1}{d_1}+\frac{1}{d_2}\right)} \quad (2)$$

may be a parameter describing a clearance, e.g. a Fresnel zone clearance, of a path. $\lambda$ may be a wavelength of electromagnetic waves. A path loss may be found, for example by measurements, and a path loss for a certain link may be found. Using path loss information a height of an obstacle that may cause a path loss may be calculated as a function of a distance from a transmitter, e.g. a base station. A plurality of points in an area may be identified and each corresponding communication link, e.g. lines connecting a base station to measurement points, may be constructed. For each link, a height of an obstacle that may produce a received signal strength may be calculated, when such obstacle may be located at such point. A minimum, or in some cases a median, value among a plurality of links may be chosen as a height of an obstacle at such point.

A Profile method process may be repeated using multiple-knife edge propagation models, and may take into account heights of obstacles that may already have an estimate, and may determine an updated height at each point. There may be several multiple knife-edge models which may be applied. For example, a Deygout method, or similar method, may be used. In such method, a total path loss may be given by $$L_{path} = 20\log_{10}\left(\frac{4\pi d}{\lambda}\right) + 13.8 + 20\log_{10}\left(\sqrt{(v_1-0.1)^2+1} + v_1 - 0.1\right) + 20\log_{10}\left(\sqrt{(v_2-0.1)^2+1} + v_2 - 0.1\right)$$

$v_1$ may be a the Fresnel clearance, and may be calculated between a transmitter and a second obstacle, and $v_2$ may be a clearance calculated between a first obstacle and a receiver. Such method may be used, and a height of an obstacle along a link path may be calculated. An assumption may be made where all other obstacle parameters, e.g. height, along the link may be correct. A second obstacle in such expression may be a most obstructing among such group of obstacles. Such a process may converge after a number of iterations. Such method may rely on lines that may connect base stations to measurement points, and may rely upon certain geometries. Such method may not require a search, and may thus have an advantage.

An embodiment of the invention may use a method that may be referred to as a Gradient search. A method may assume that for a certain area a building density, e.g. a number of buildings, may be determined, and such information may be useful. In such method, a model may be created where a given number of buildings may be spread randomly over an area, predictions of parameters, e.g. height predictions, that may be based on one or more predetermined factors, e.g. database or mapping information, may be determined. A quality of predictions compared to measurements at any point may be calculated. Such quality may be a function of an error between a signal strength prediction and an actual measurement. A mean squared error, or a root mean square of an error, for example, may be typical functions that may be used for such a purpose. A location of each building may be changed slightly, and a location that may improve an overall quality may be chosen as a new location of a building. Repetition of such process for each building may improve an overall quality between each step, and may continue until no further improvement may be observed, or a desired minimum improvement may be reached. For a prediction, any physical model may be used, e.g., single knife-edge, multiple knife-edge etc., and such model may also include an effect of diffraction around buildings. A mean-square error may be used as a measure of quality of a prediction, although other criteria may also be used. Extensive computation may be utilized by such method and local minimum solutions of a quality criterion may be avoided.

An embodiment of the invention may use a method that may be referred to as a Genetic Algorithm Optimization. A method may assume that a number of buildings in an area may be known. Each set of random locations may be treated as a "gene", and a population of such genes may be produced. A best solution may be searched for and found using genetic algorithm techniques, and such method may be an alternative to other algorithms, e.g. step by step optimization techniques. Such method may be very efficient in searching over a large space of solutions. Determination of local minima may require additional computation. A genetic algorithm may be used when a search may be required over a large number of locations. A genetic algorithm may be a best fit method of calibration. It may begin with a random, or seeded random, obstacle locations and/or heights, and each may be represented mathematically, e.g. by vectors or matrixes. A set of parameters, e.g. a location in three dimensional space, may be associated with each obstacle. A set of vectors and/or matrixes may be "mutated" or varied where one or more parameters may be changed, or pairs, or other combinations of parameters may be changed together. Calculations may be made that may compare a mutated model to measured data and/or estimates of signal strengths, as described herein. Such a mutation process may continue until a model is fit to measurement data to within an allowed difference, for example by minimizing a difference between a model and estimates. A convergence time may depend on starting model parameters.

An embodiment of the invention may use a method that may be referred to as a Building Replacement method. A method may begin by creating a model where an area may be portioned into small squares, and placement of buildings may be made into some squares. Each square that may be vacant of a building may be considered. A determination may be made of a possibility of moving a building into such vacant square from each of other squares that do contain a building. Accuracy of such model may require additional consideration.

Some embodiments of the invention may use a combination of methods presented above, as a Combined method. Such a method may use a plurality of the above described methods, and such combinatory method may be more useful for various scenarios, geometries and availability of drive test data, or other data. For example, a knife-edge assumption may serve as an initialization step and an upper bound to building heights. Then, a solution may be improved using, for example, a genetic algorithm, a building replacement method and a local gradient search.

Embodiments of the invention may use additional information that may be available, for example that may be found from maps, e.g. road maps, or from other land use data. Such additional information may be a lower cost to acquire, and may be more readily available. Obstacle placement may be constrained along road sides or may be limited to areas of which a use may be adequate. Such placement may allow a search space to be limited and performance of a method described herein may be improved.

Figure 11:
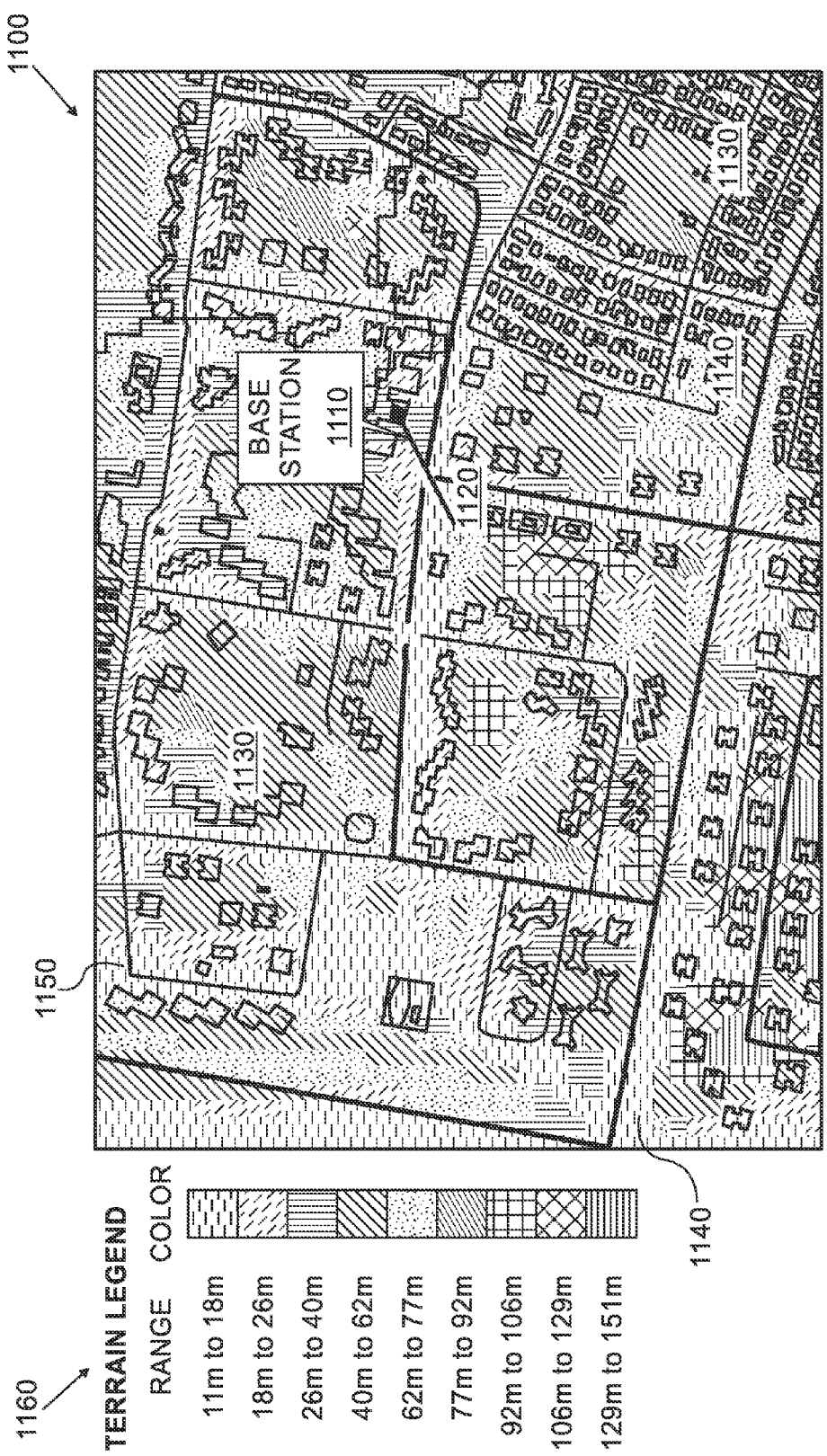
FIG. 11 depicts an exemplary diagram according to embodiments of the present invention.

FIG. 11 may describe results of an algorithm, that may use a knife-edge assumption method. An exemplary urban area may be shown 1100, which may include buildings 1130, and roads 1140. Contrasts may represent heights of elements, e.g. ground, buildings, or other obstacles, as may be calculated by an algorithm described herein. Low elevations may be darker, and additional progressively lighter contrasts may represent heights of obstacles in an increasing order, and may be detailed in an attached legend 1160. A base station 1110 may include an antenna, e.g. a single sector antenna, and may be located on top of a building. An antenna may be directed in a particular direction, e.g. south west, as shown by directional line 1120. A street level 1150 may be detected quite well, and may be determined by a distinguishing contrast between a street level 1150 and surrounding areas. Buildings may also be detected. An accuracy of detection of a street level 1150 may be better, in some embodiments, than an accuracy of detection of buildings 1130.

Figure 12:
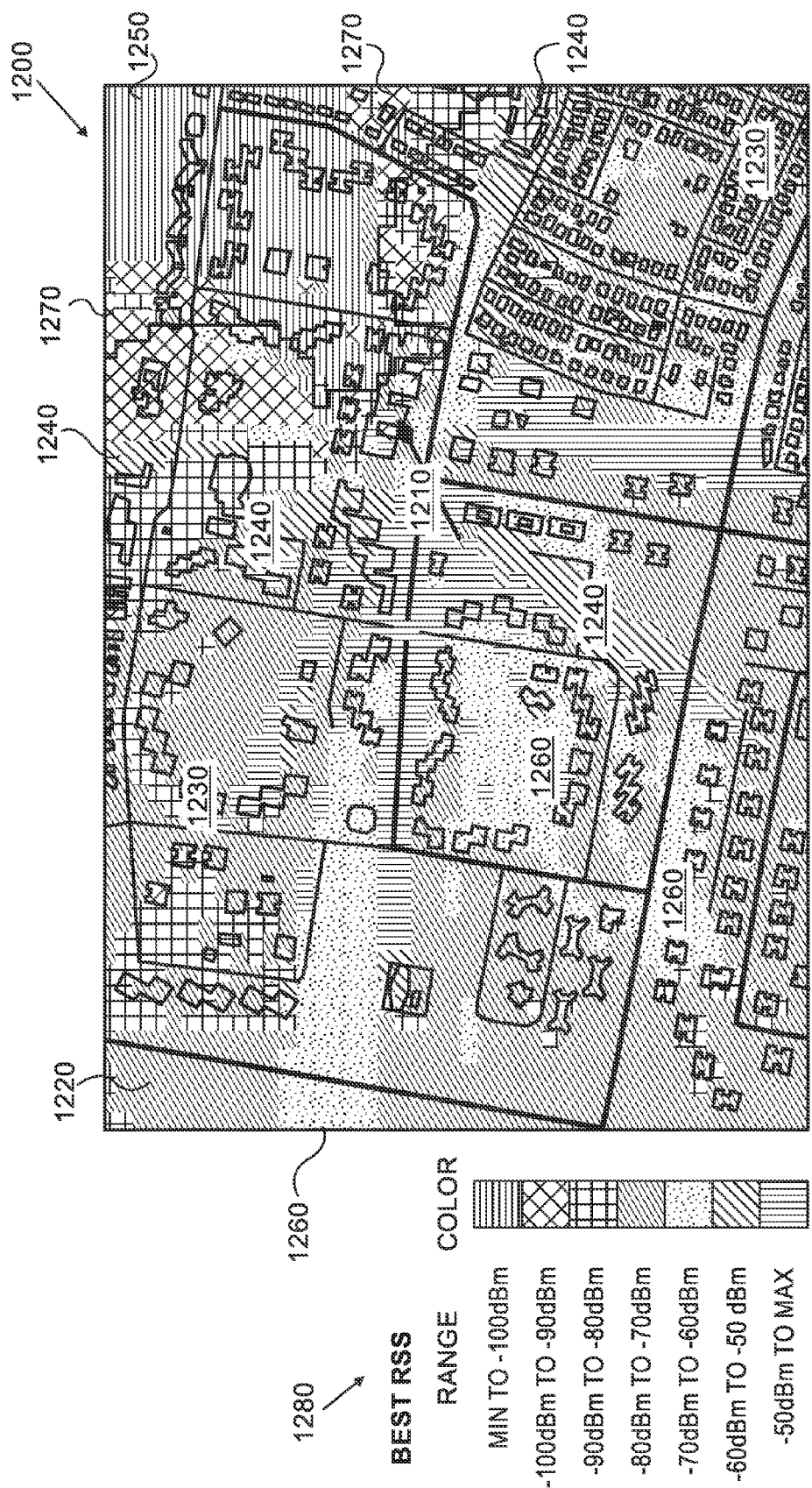
FIG. 12 depicts an exemplary diagram according to embodiments of the present invention.

FIG. 12 may describe results of an algorithm, that may include use of a database, e.g. a high accuracy database, that may include location information for each building. An exemplary urban area may be shown 1200, which may include buildings 1230, streets 1220, and/or other features. A high accuracy database may be used to calculate a received signal strength, and may be depicted on such exemplary urban area 1200. Signal strength is shown in contrast, where areas receiving a high level signal 1240 are shown, areas with an amount of lower signal strength 1260 are shown, areas of lower signal strength are shown 1270, and areas of lowest signal strength 1250 are also shown. Thus distinguishing levels of signal strength may be depicted. A directional antenna may be used for measurements in such an exemplary environment, and may be pointed in a given direction 1210. An area of high signal strength 1240 may be found, for example, in a direction consistent with a direction 1210 of a directional antenna. An area of low signal strength 1250 may be found in a direction opposite a direction 1210 of a directional antenna. A received signal strength (RSS) may be grouped into ranges 1280.

Figure 13:
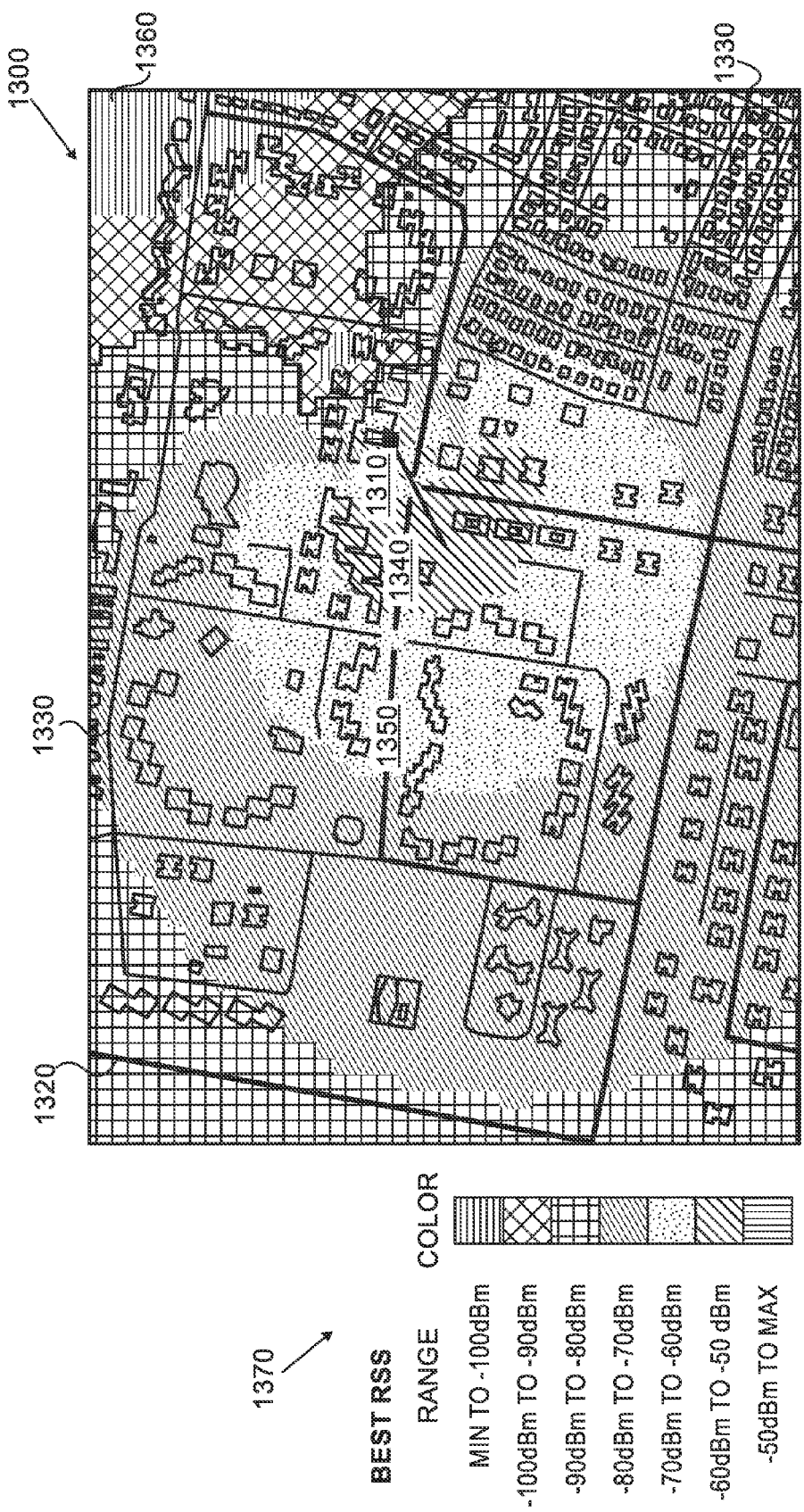
FIG. 13 depicts an exemplary diagram according to embodiments of the present invention.

An exemplary embodiment where a Hata model may be used is shown by FIG. 13. An exemplary urban area may be shown 1300, which may include buildings 1330, streets 1320, and/or other features, and which may exclude building information from a model. A HATA model may be calibrated and may be used for prediction. It may be seen that without additional information a signal strength may depend on a direction that may be relative to system parameters, e.g. a sector boresight and/or a range. An antenna, for example a directional antenna, may point in a direction 1310. A region of high signal strength 1340, a region of lower signal strength 1340, a region of lowest signal strength 1360, and other signal strength regions may be shown. An area of high signal strength 1340 may be found, for example, in a direction consistent with a direction 1310 of a directional antenna. An area of low signal strength 1360 may be found in a direction opposite a direction 1310 of a directional antenna. A received signal strength (RSS) may be grouped into ranges 1370.

Figure 14:
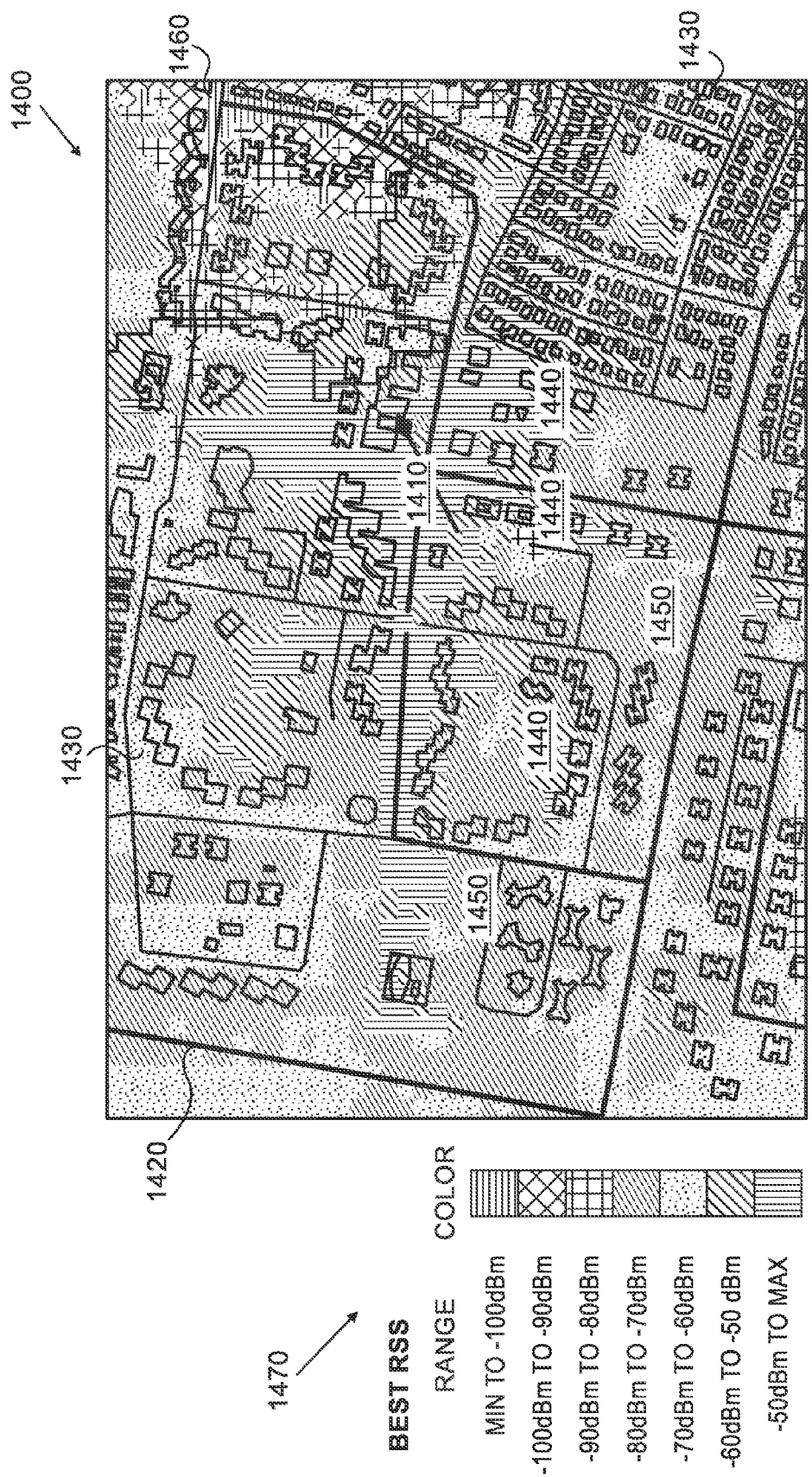
FIG. 14 depicts an exemplary diagram according to embodiments of the present invention.

An embodiment may perform a prediction, and may utilize estimated building heights as described above, and shown in an exemplary fashion by FIG. 11. A result of such a prediction may be shown by an exemplary urban area 1400 of FIG. 14, which may include buildings 1430, streets 1420, and/or other features. A region of high signal strength 1440, a region of lower signal strength 1450, a region of lowest signal strength 1460, and other signal strength regions may be shown. An area of high signal strength 1440 may be found, for example, in a direction consistent with a direction 1410 of a directional antenna. An area of low signal strength 1460 may be found in a direction opposite a direction 1410 of a directional antenna. A received signal strength (RSS) may be grouped into ranges 1470. By comparison, such a prediction may be much better than a prediction that may be based, for example, on a HATA model, alone, and may more easily identify a true signal strength along a street. It may produce quite accurate results in other parts of an area as well. A lack of data may result in an algorithm not entirely identifying an obstruction that may be caused by a building that may be behind a base station, but this may be identifiable. However, such a prediction may be obviously superior to a standard HATA model calibration technique.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of constructing a map of a physical environment for radio signal propagation comprising:
   determining a wireless signal propagation model;
   receiving at a receiver unit a wireless communication signal from a transmitter unit;
   storing a strength of said received wireless communication signal and associated locations of said receiver unit and said transmitter unit;
   modifying said wireless signal propagation model based at least on said stored strength of said wireless communication signal and said associated locations of said receiver unit and said transmitter unit;
   constructing a map comprising locations of one or more obstacles based on said modified wireless signal propagation model.

2. The method of claim 1, further comprising using said modified wireless signal propagation model and said map of locations of obstacles to predict wireless signal strengths of a wireless communication signal received from a mobile wireless communication device.

3. The method of claim 1, wherein said first receiver unit is a mobile communication device.

4. The method of claim 1, further comprising repeating said receiving and storing stages for a plurality of wireless communication signals and a respective plurality of locations.

5. The method of claim 4, wherein said strengths of said wireless communication signals and said associated locations of said receiver units are stored in a database.

6. The method of claim 1, wherein said map includes heights of said obstacles.

7. The method of claim 1, wherein constructing said map comprises constructing said map by a combination of one or more methods selected from the group consisting of: an analysis by profile method, a gradient search method, a genetic algorithm method, and a building replacement method.

8. The method of claim 1, wherein said wireless signal propagation model is selected from the group consisting of: a single knife-edge model, a multiple knife-edge model, a single wedge model, a rounded obstacle model, a diffraction inclusive model, a model inclusive of effects of vegetation on RF signal propagation, and a ray tracing model.

9. The method of claim 1, wherein said wireless signal propagation model is subject to regression analysis for calibration.

10. The method of claim 1, wherein constructing said map is further based on information from a preexisting map.

11. The method of claim 1, wherein said receiver unit is a mobile wireless communication device and said transmitter unit is a base station in communication therewith.

12. The method of claim 1, wherein said transmitter unit is a mobile wireless communication device and said receiver unit is a base station in communication therewith.

13. The method of claim 1, further comprising:
   receiving at the transmitter unit a second wireless communication signal from the receiver unit;
   storing a second strength of said second received wireless communication signal and associated locations of said receiver unit and said transmitter unit;
   modifying said wireless signal propagation model based at least on said stored second strength of said wireless communication signal and said associated locations of said receiver unit and said transmitter unit, wherein said map further comprises locations of one or more obstacles based on said modified wireless signal propagation model.

14. A system for constructing a map of a physical environment for radio signal propagation comprising:
   a transmitter;
   a receiver comprising: a receiver unit to receive wireless communication signals from the transmitter, a measurement unit to measure received signal strengths of received wireless communication signals, and a storage to store said received signal strength measurements and associated locations of signal reception;
   a memory to store a wireless signal propagation model;
   a processor to: modify said wireless signal propagation model based at least on said stored received signal strength measurements and said associated locations of signal reception, and to construct a map comprising locations of one or more obstacles based on said modified wireless signal propagation model.

15. The system of claim 14, wherein said processor is further to predict wireless signal strengths of a wireless communication signal received from a mobile wireless communication device, said prediction using said modified wireless signal propagation model and said map of locations of obstacles.

16. The system of claim 14, wherein said receiver unit is to receive a plurality of wireless communication signals, and wherein said measurement unit is to measure received signal strengths of said respective received wireless communication signals, and wherein said processor is to modify said wireless signal propagation model based on said plurality of signal strength measurements and said associated locations of signal reception.

17. The system of claim 14, wherein said processor is to construct said map using one or more methods selected from the group consisting of: an analysis by profile method, a gradient search method, a genetic algorithm method, and a building replacement method.

18. The system of claim 14, wherein said wireless signal propagation model is selected from the group consisting of: a single knife-edge model, a multiple knife-edge model, a single wedge model, a rounded obstacle model, a diffraction inclusive model, a model inclusive of effects of vegetation on RF signal propagation, and a ray tracing model.

19. The system of claim 14, wherein said processor is further to construct said map based on information from a preexisting map.

20. The system of claim 14, wherein said receiver is a mobile wireless communication device and said transmitter is a base station in communication therewith.

21. The system of claim 14, wherein said transmitter is a mobile wireless communication device and said receiver is a base station in communication therewith.

22. The system of claim 14,
wherein said receiver further comprises a second transmitter unit;
wherein said transmitter further comprises a second receiver unit to receive second wireless communication signals from the receiver, a measurement unit to measure received signal strengths of second received wireless communication signals, and a second storage to store said second received signal strength measurements and associated locations of signal reception, and
said processor to: modify said wireless signal propagation model based at least on said stored second received signal strength measurements and said associated locations of signal reception, and to construct said map based on said modified wireless signal propagation model.

* * * * *